(12) United States Patent
Shimazu

(10) Patent No.: US 11,041,747 B2
(45) Date of Patent: Jun. 22, 2021

(54) SENSOR UNIT AND AIRFLOW MEASUREMENT APPARATUS

(71) Applicant: MINEBEA MITSUMI Inc., Nagano (JP)

(72) Inventor: Yuki Shimazu, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 154 days.

(21) Appl. No.: 16/433,451

(22) Filed: Jun. 6, 2019

(65) Prior Publication Data

US 2019/0376829 A1 Dec. 12, 2019

(30) Foreign Application Priority Data

Jun. 11, 2018 (JP) .............................. JP2018-110911

(51) Int. Cl.
*G01F 15/14* (2006.01)
(52) U.S. Cl.
CPC .................................... *G01F 15/14* (2013.01)
(58) Field of Classification Search
CPC ...... G01F 15/024; G01F 15/066; G01F 15/14; G01F 1/6842; G01F 1/6845; G01F 5/00
See application file for complete search history.

(56) References Cited

U.S. PATENT DOCUMENTS

| | | | |
|---|---|---|---|
| 2005/0081620 A1* | 4/2005 | Ito | G01F 1/698 73/202.5 |
| 2007/0089503 A1* | 4/2007 | Nakano | G01F 1/696 73/204.26 |
| 2013/0192354 A1* | 8/2013 | Kaifu | G01F 1/6842 73/114.32 |
| 2016/0116320 A1* | 4/2016 | Wolgamott | G01F 15/00 73/114.33 |
| 2017/0153651 A1* | 6/2017 | Burgi | G01F 15/00 |

FOREIGN PATENT DOCUMENTS

JP H06-117679 4/1994

* cited by examiner

*Primary Examiner* — Francis C Gray
(74) *Attorney, Agent, or Firm* — IPUSA, PLLC

(57) ABSTRACT

A sensor unit includes a first component including an airflow sensor; a second component; and a third component. The first component includes a lower end portion that is selectively connectable to the second component or the third component, and an upper end portion that is selectively connectable to the third component or the second component.

12 Claims, 25 Drawing Sheets

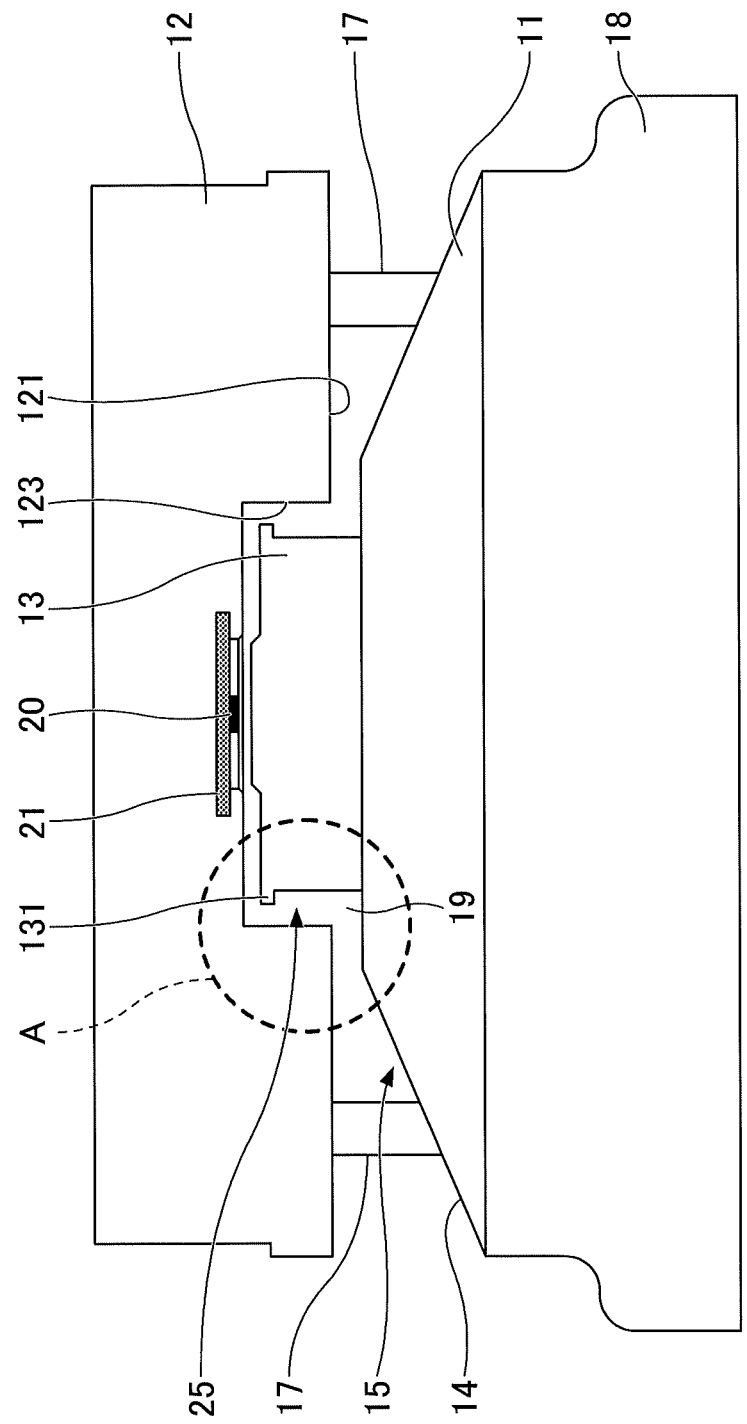

FIG.18
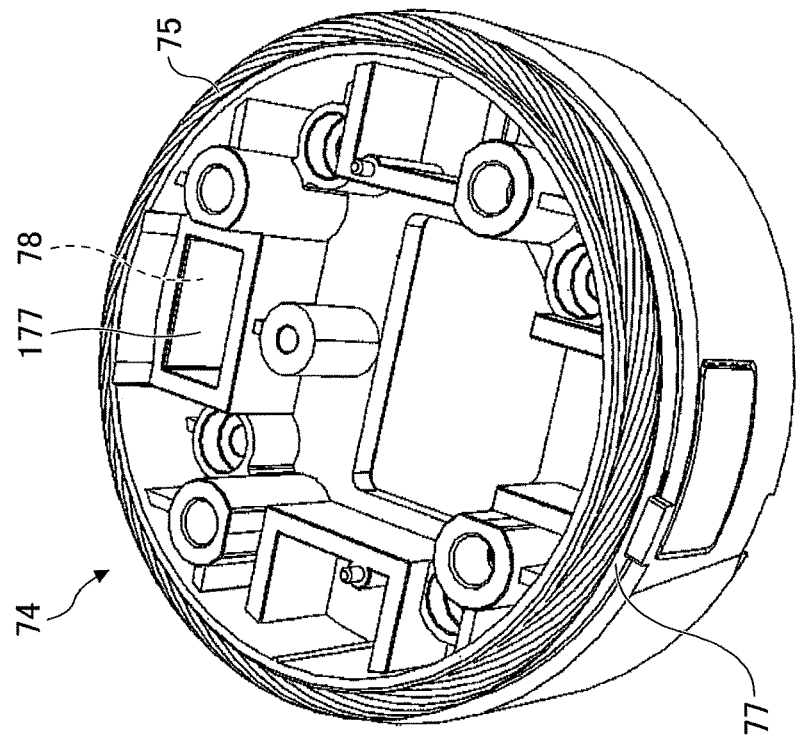
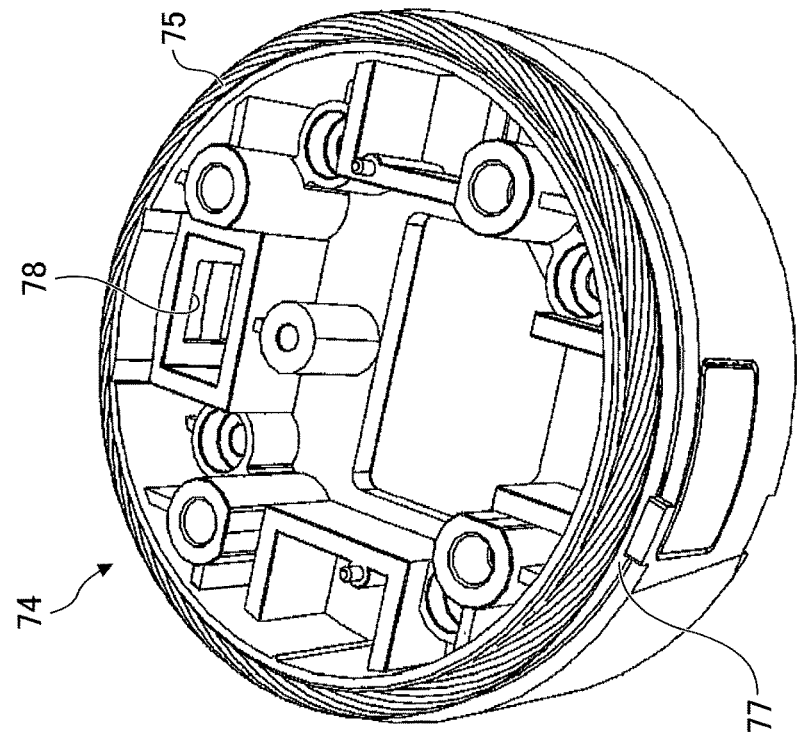

SENSOR UNIT AND AIRFLOW MEASUREMENT APPARATUS

CROSS-REFERENCE TO RELATED APPLICATIONS

This application is based on and claims priority to Japanese Patent Application No. 2018-110911 filed on Jun. 11, 2018, the entire contents of which are incorporated herein by reference.

BACKGROUND OF THE INVENTION

1. Field of the Invention

The present invention relates to a sensor unit and an airflow measurement apparatus.

2. Description of the Related Art

Conventionally, a sensor unit including a substrate, on which a plurality of sensors including an airflow sensor is famed in advance, is known (see, e.g., Patent Document 1).

Patent Document 1: Japanese Unexamined Patent Application Publication No. H6-117679

However, in the conventional technology, when a new sensor is to be added, the substrate needs to be changed, and, therefore, versatility and extensibility (e.g., ease of extending function) are not sufficiently considered.

SUMMARY OF THE INVENTION

Embodiments of the present invention can provide a sensor unit and an airflow measurement apparatus having high versatility and high extensibility.

According to one aspect of embodiments of the present invention, there is provided a sensor unit including a first component including an airflow sensor; a second component; and a third component, wherein the first component includes a lower end portion that is selectively connectable to the second component or the third component, and an upper end portion that is selectively connectable to the third component or the second component.

Furthermore, according to another aspect of embodiments of the present invention, there is provided an airflow measurement apparatus including an airflow sensor; a first flow passage plate; a second flow passage plate disposed facing the first flow passage plate; at least one support post configured to support the second flow passage plate with respect to the first flow passage plate so as to form a space, in which the airflow sensor is disposed, between the first flow passage plate and the second flow passage plate; a first substrate on which the airflow sensor is mounted, the first substrate being installed in the second flow passage plate; and a second substrate connected to the first substrate via a conductor passing through the at least one support post, the second substrate being installed in the first flow passage plate.

BRIEF DESCRIPTION OF THE DRAWINGS

FIGS. 13A and 13B are diagrams for indicating an enlarged view of the main portion of the airflow measurement apparatus of FIG. 12;

FIG. 18 is a perspective view of a sensing block with a third substrate removed;

DESCRIPTION OF THE PREFERRED EMBODIMENTS

Figure 1:
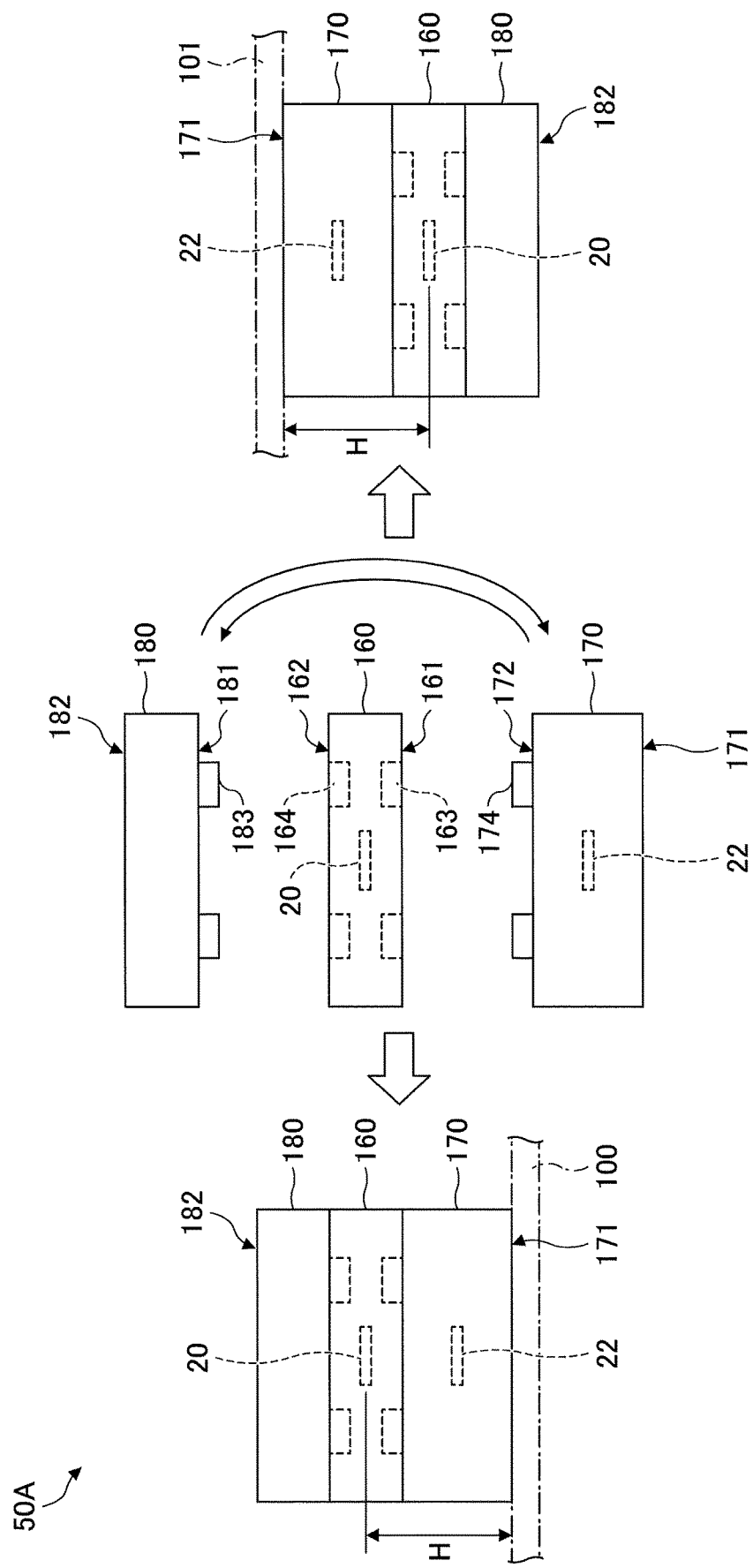
FIG. 1 is a diagram schematically illustrating an example of recombining components in a sensor unit according to a first embodiment.

Hereinafter, an embodiment for carrying out the present invention will be described with reference to the drawings. In the respective drawings, the same elements are denoted by the same reference numerals, and overlapping descriptions may be omitted.

FIG. 1 is a diagram schematically illustrating an example of recombining components in a sensor unit according to a first embodiment of the present invention. A sensor unit 50A illustrated in FIG. 1 includes a first component 160, a second component 170, and a third component 180.

The first component 160 includes at least one airflow sensor 20. The airflow sensor 20 measures the flow of a gas such as air, and outputs a sensor signal corresponding to the measurement result.

The second component 170 includes at least one other sensor 22 separate from the airflow sensor 20. The sensor 22 is a separate sensor from the airflow sensor 20. The sensor 22 is a different type of environmental sensor (e.g., a temperature sensor) from the airflow sensor 20; however, the sensor 22 may be a similar sensor (i.e., an airflow sensor) to the airflow sensor 20. The sensor 22 is a sensor for measuring the environment in which the sensor unit 50A is installed, and specific examples of the sensor 22 include, but are not limited to, a temperature sensor, a humidity sensor, an illuminance sensor, a pressure sensor, a geomagnetic sensor, and the like.

In addition to measuring the airflow by the airflow sensor 20, environmental parameters other than the airflow can be measured by the sensor 22, so that multiple types of environmental information can be collected at a time.

The third component 180 may be a component including at least one of the sensors as described above, or may be a component without a sensor. The third component 180 may be a protective component, such as a lid or a cover, for example.

The first component 160 has a lower end portion 161 selectively connectable to the second component 170 or the third component 180, and an upper end portion 162 selectively connectable to the third component 180 or the second component 170. By having the lower end portion 161 and the upper end portion 162, the sensor unit 50A can be changed to the configuration on the left side of FIG. 1 or changed to the configuration on the right side of FIG. 1.

In the configuration on the left of FIG. 1, the second component 170 is connected to the lower end portion 161, the third component 180 is connected to the upper end portion 162, the second component 170 is disposed at a stage below the first component 160, and the third component 180 is disposed at a stage above the first component 160. In the configuration on the right of FIG. 1, the third component 180 is connected to the lower end portion 161, the second component 170 is connected to the upper end portion 162, the third component 180 is disposed at a stage below the first component 160, and the second component 170 is disposed at a stage above the first component 160. That is, the components can be recombined such that the sensor 22 can be placed below or above the airflow sensor 20.

Thus, the sensor unit 50A can be separated into the first component 160, the second component 170, and the third component 180, and, therefore, it is easy to add a new sensor or to make changes in accordance with the environment in which the sensor unit 50A is installed.

For example, by connecting the second component 170 to the first component 160, the other sensor 22 can be easily added to the first component 160, and thus the functions can be easily extended. Further, by connecting the third component 180 to the first component 160, the function of the third component 180 can be easily newly added, and thus the functions can be easily extended.

For example, by replacing the second component 170 with another second component 170 including a different type of sensor 22, the sensor 22 can be easily replaced with the different type of sensor 22. In addition, by replacing the third component 180 with the third component 180 having another function, the function can be easily changed to the other function. Further, by replacing the first component 160 with another first component 160 having the airflow sensor 20 of a different specification, the airflow sensor 20 can be easily changed to the airflow sensor 20 of a different specification. Further, if the sensor 22 is not required, the second component 170 may be removed from the first component 160, so that the functions can be easily reduced. In this way, it is possible to provide the sensor unit 50A that is highly versatile.

In addition, even if a failure occurs in any one of the first component 160, the second component 170, and the third component 180, only the failed component is to be replaced. Therefore, compared to the case of replacing all of the components, it is easier to perform the replacement work with respect to the failure, and the cost can be reduced.

Further, in the case of the sensor unit 50A, the second component 170 and the third component 180 can be replaced with each other above and below the first component 160. The flow of gas to be measured by the airflow sensor 20 provided in the first component 160 easily changes depending on the structure and shape of the sensor unit, and, therefore, measurement errors would otherwise tend to increase. However, in the case of the sensor unit 50A, the second component 170 and the third component 180 can be replaced with each other above and below the first component 160, and, therefore, the position of the airflow sensor 20 in the vertical direction (the height direction) is less likely to change before and after replacing the second component 170 and the third component 180 with each other. Accordingly, it is possible to inhibit measurement errors by the airflow sensor 20 from varying before and after replacing the second component 170 and the third component 180 with each other.

In the embodiment illustrated in FIG. 1, the second component 170 has a first end portion 172 that is selectively connectable to the lower end portion 161 or the upper end portion 162. The third component 180 has a second end portion 181 that is selectively connectable to the upper end portion 162 or the lower end portion 161. For example, the second end portion 181 connected to the upper end portion 162 is formed in the same shape as the first end portion 172 connected to the lower end portion 161, and, therefore, the second end portion 181 can also be connected to the lower end portion 161, and the first end portion 172 can also be connected to the upper end portion 162. In the case of FIG. 1, the first end portion 172 has a protruding portion 174 formed to fit into a recess portion 163 formed in the lower end portion 161, and the second end portion 181 has a protruding portion 183 formed to fit into a recess portion 164 formed in the upper end portion 162.

In the embodiment illustrated in FIG. 1, the second component 170 has a third end portion 171 on the opposite side of the first end portion 172, and the third component 180 has a fourth end portion 182 on the opposite side of the second end portion 181. The third end portion 171 or the fourth end portion 182 is preferably attachable to a fixing portion external to the sensor unit. FIG. 1 illustrates an example in which the third end portion 171 is attachable to a fixing portion 100 or a fixing portion 101 external to the sensor unit. Measurement errors by the airflow sensor 20 would increase due to turbulence being caused by the gas hitting the fixing portion, unless the height H, from the fixing portion to which the sensor unit 50A is attached to the airflow sensor 20, is relatively large. According to the present embodiment, the height H is approximately equal in the left configuration and the right configuration in FIG. 1, and, therefore, it is possible to inhibit a change in measurement errors before and after the replacement. Note that the fourth end portion 182 may be formed so as to be attachable to a fixing portion external to the sensor unit.

Figure 2:
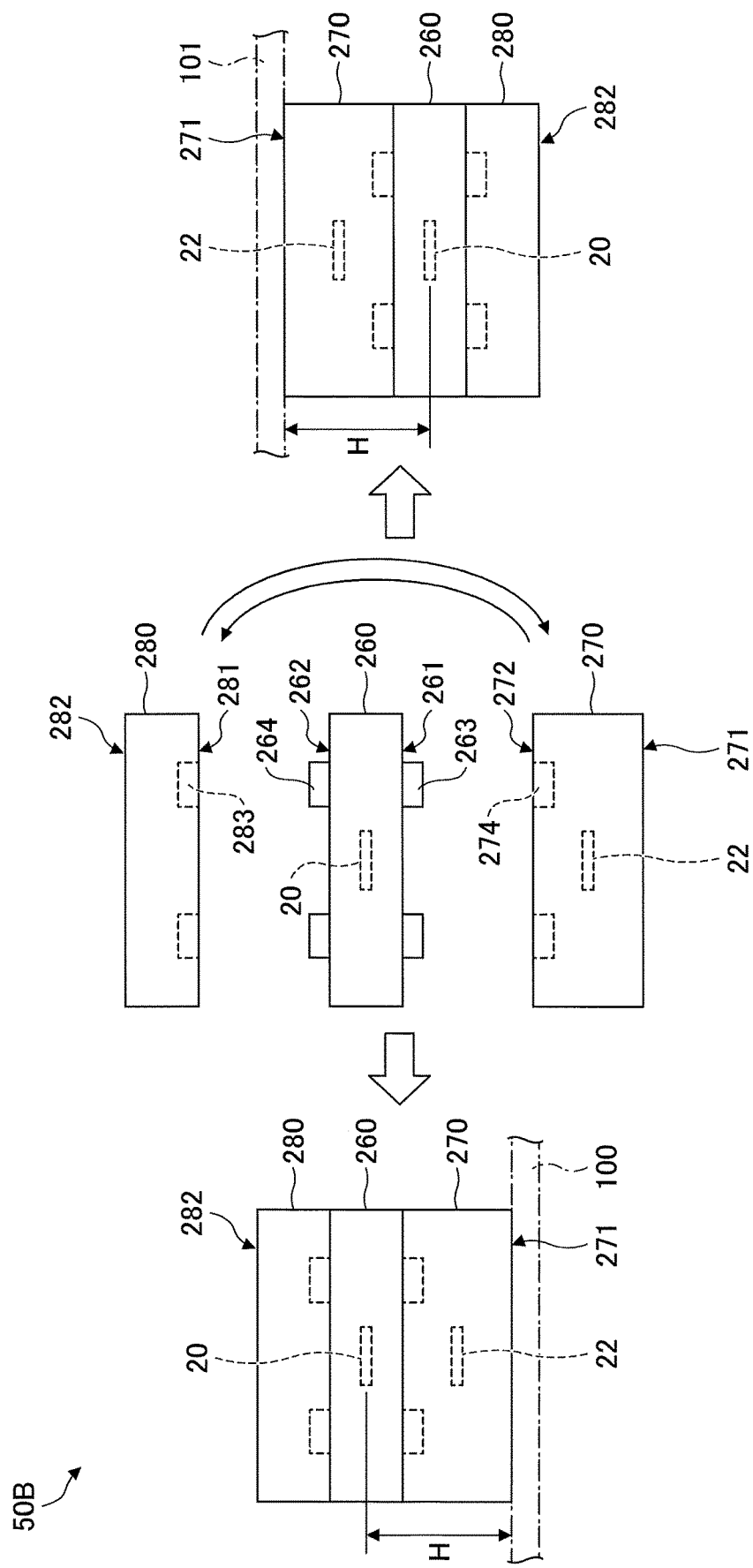
FIG. 2 is a diagram schematically illustrating an example of recombining components in a sensor unit according to a second embodiment.

FIG. 2 is a diagram schematically illustrating an example of recombining components in a sensor unit according to a second embodiment of the present invention. Descriptions of configurations and effects similar to those of the above-described embodiment will be omitted or simplified by incorporating the foregoing descriptions.

A sensor unit 50B illustrated in FIG. 2 includes a first component 260, a second component 270, and a third component 280. The first component 260 includes at least one airflow sensor 20. The second component 270 includes at least one other sensor 22 separate from the airflow sensor 20. The third component 280 may be a component including at least one of the sensors as described above, or may be a component without a sensor.

The first component 260 has a lower end portion 261 selectively connectable to the second component 270 or the third component 280, and an upper end portion 262 selectively connectable to the third component 280 or the second component 270. By having the lower end portion 261 and the upper end portion 262, the sensor unit 50B can be changed to the configuration on the left side of FIG. 2 or changed to the configuration on the right side of FIG. 2.

In the embodiment illustrated in FIG. 2, the second component 270 has a first end portion 272 that is selectively connectable to the lower end portion 261 or the upper end portion 262. The third component 280 has a second end portion 281 that is selectively connectable to the upper end portion 262 or the lower end portion 261. In the case of FIG. 2, the first end portion 272 has a recess portion 274 famed to fit to a protruding portion 263 formed in the lower end portion 261, and the second end portion 281 has a recess portion 283 formed to fit to a protruding portion 264 formed in the upper end portion 262. The second component 270 also has a third end portion 271 on the opposite side of the first end portion 272, and the third component 280 has a fourth end portion 282 on the opposite side of the second end portion 281. The third end portion 271 or the fourth end portion 282 is preferably attachable to a fixing portion external to the sensor unit. FIG. 2 illustrates an example in which the third end portion 271 is attachable to the fixing portion 100 or the fixing portion 101 external to the sensor unit. According to the present embodiment, the height H is approximately equal in the left configuration and the right configuration in FIG. 2, and, therefore, it is possible to inhibit a change in measurement errors before and after the replacement. Note that the fourth end portion 282 may be formed so as to be attachable to a fixing portion external to the sensor unit.

Figure 3:
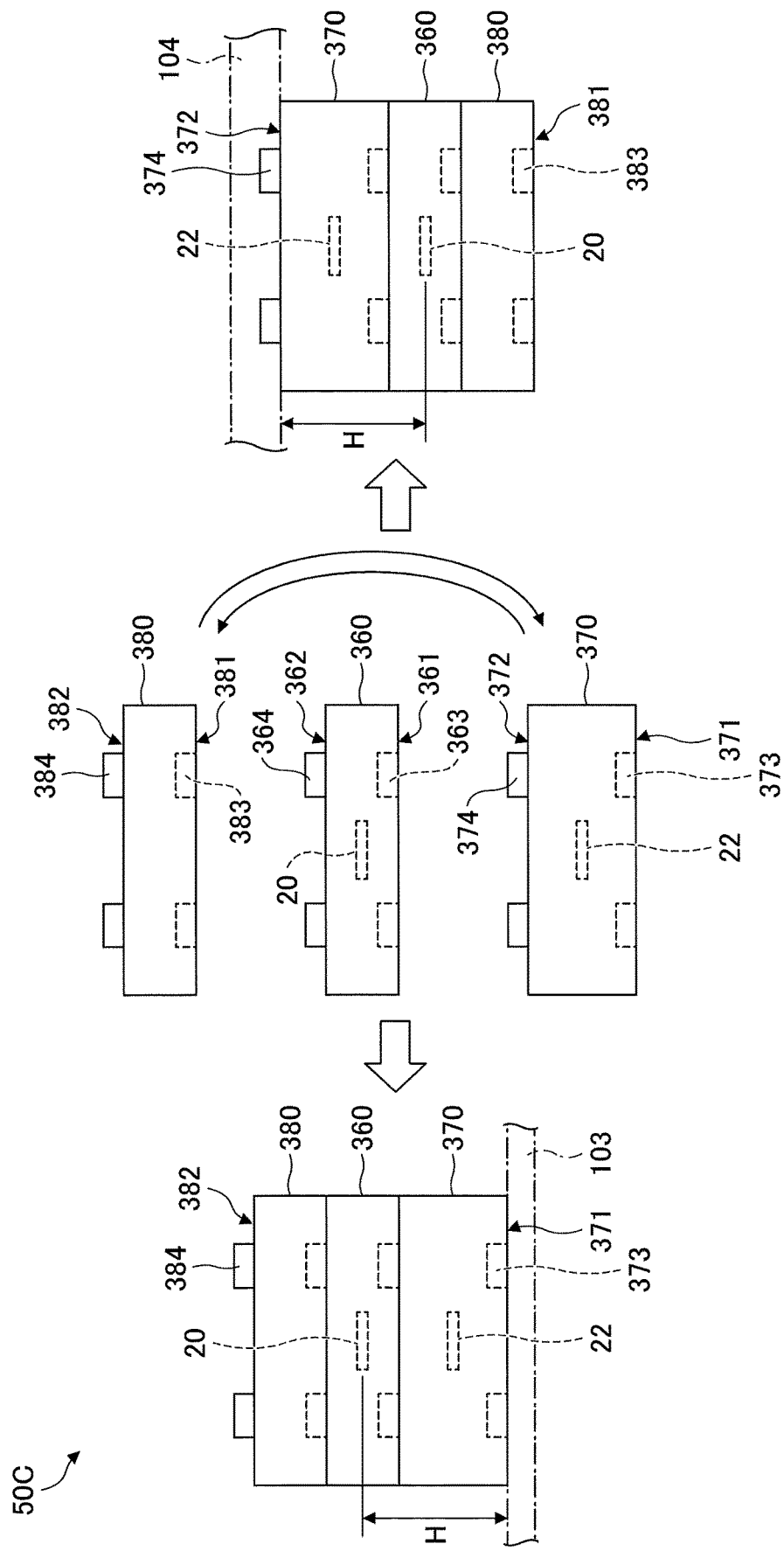
FIG. 3 is a diagram schematically illustrating an example of recombining components in a sensor unit according to a third embodiment.

FIG. 3 is a diagram schematically illustrating an example of recombining components in a sensor unit according to a third embodiment of the present invention. Descriptions of configurations and effects similar to those of the above-described embodiments will be omitted or simplified by incorporating the foregoing description.

A sensor unit 50C illustrated in FIG. 3 includes a first component 360, a second component 370, and a third component 380. The first component 360 includes at least one airflow sensor 20. The second component 370 includes at least one other sensor 22 separate from the airflow sensor 20. The third component 380 may be a component including at least one of the sensors as described above, or may be a component without a sensor.

The first component 360 has a lower end portion 361 selectively connectable to the second component 370 or the third component 380, and an upper end portion 362 selectively connectable to the third component 380 or the second component 370. By having the lower end portion 361 and the upper end portion 362, the sensor unit 50C can be changed to the configuration on the left side of FIG. 3 or changed to the configuration on the right side of FIG. 3.

In the embodiment illustrated in FIG. 3, the second component 370 includes a first connection end portion 372 connected to the lower end portion 361 when disposed at a stage below the first component 360, and a second connection end portion 371 connected to the upper end portion 362 when disposed at a stage above the first component 360. The third component 380 includes a third connection end portion 381 that is connected to the upper end portion 362 when disposed at a stage above the first component 360, and a fourth connection end portion 382 that is connected to the lower end portion 361 when disposed at a stage below the first component 360.

In the case of FIG. 3, the first connection end portion 372 has a protruding portion 374 formed to fit into a recess portion 363 formed in the lower end portion 361, and the second connection end portion 371 has a recess portion 373 formed to fit to a protruding portion 364 formed in the upper end portion 362. The second connection end portion 371 is positioned on the opposite side of the first connection end portion 372. In the case of FIG. 3, the third connection end portion 381 has a recess portion 383 formed to fit to a protruding portion 364 formed in the upper end portion 362, and the fourth connection end portion 382 has a protruding portion 384 formed to fit into a recess portion 363 formed in the lower end portion 361. The fourth connection end portion 382 is positioned on the opposite side of the third connection end portion 381.

The first connection end portion 372 or the second connection end portion 371 is preferably attachable to a fixing portion external to the sensor unit. FIG. 3 illustrates an example in which the second connection end portion 371 is attachable to a fixing portion 103 external to the sensor unit, and the first connection end portion 372 is attachable to a fixing portion 104 external to the sensor unit. According to the present embodiment, the height H is approximately equal in both the left configuration and the right configuration in FIG. 3, and, therefore, it is possible to inhibit a change in measurement errors before and after the replacement.

Figure 4:
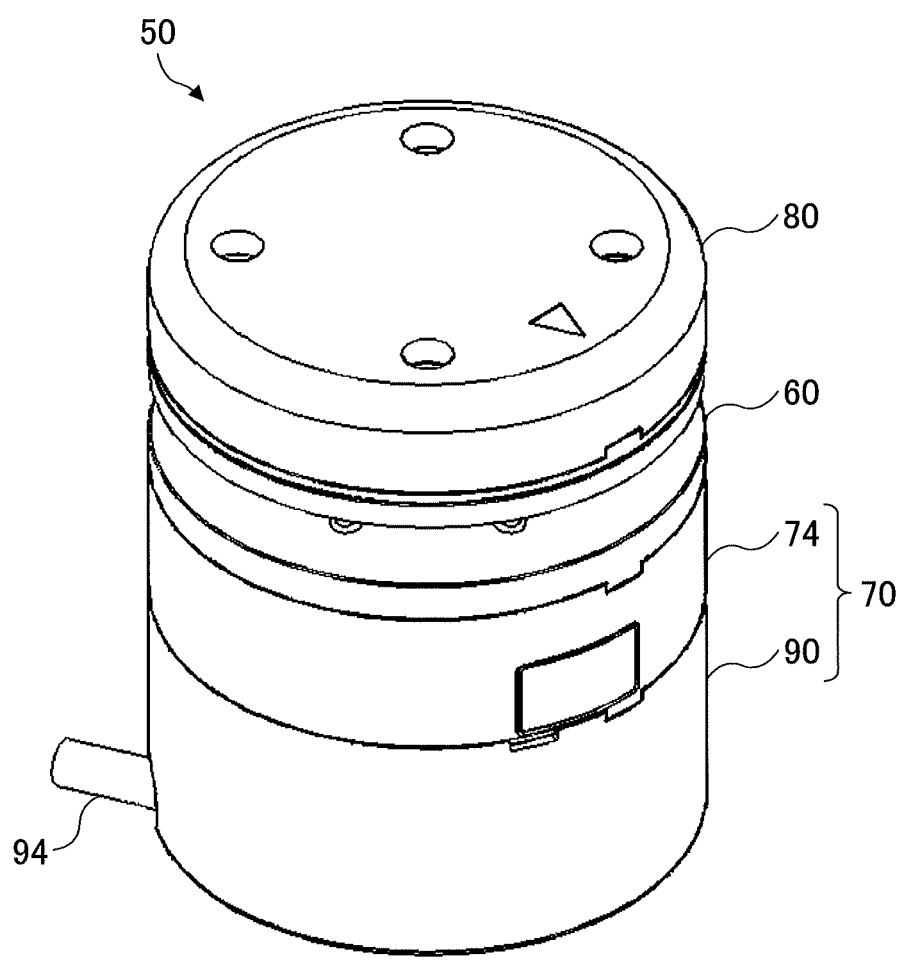
FIG. 4 is a perspective view illustrating a specific example of a sensor unit according to an embodiment.
Figure 5:
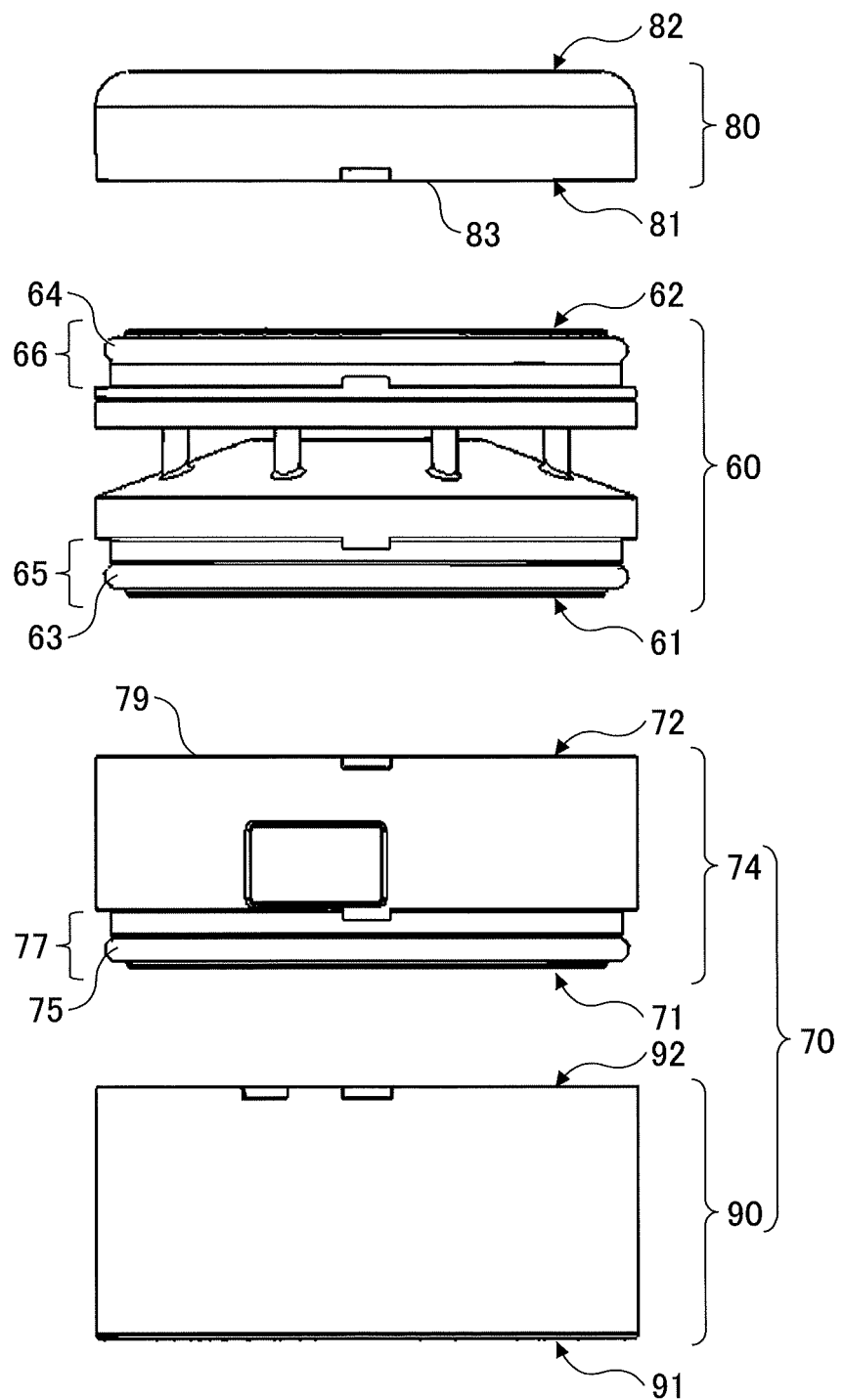
FIG. 5 is an exploded side view illustrating the specific example of a sensor unit according to an embodiment.

FIG. 4 is a perspective view illustrating a specific example of a sensor unit 50 of an embodiment. FIG. 5 is an exploded side view illustrating the specific example of the sensor unit 50 of an embodiment illustrated in FIG. 4. The sensor unit 50 illustrated in FIG. 4 includes an airflow measurement block 60, a lower block 70, and an upper block 80. The airflow measurement block 60 is an example of a first component and includes at least one airflow sensor 20. The lower block 70 is an example of a second component and includes at least one other sensor 22 separate from the airflow sensor 20. The upper block 80 is an example of a third component and is a top lid without sensors. A first end portion 72 has a first peripheral portion 79 that selectively fits to a lower end portion 61 or an upper end portion 62, and a second end portion 81 has a second peripheral portion 83 that selectively fits to the upper end portion 62 or the lower end portion 61.

In this embodiment, the first peripheral portion 79 is formed to selectively fit into a peripheral portion 65 formed in the lower end portion 61 or a peripheral portion 66 formed in the upper end portion 62. The second peripheral portion 83 is formed to selectively fit into the peripheral portion 66 formed in the upper end portion 62 or the peripheral portion 65 formed in the lower end portion 61. The peripheral portion 65 has an O-ring 63 attached thereto for blocking water from entering from the peripheral portion 65, and the peripheral portion 66 has an O-ring 64 attached thereto for blocking water from entering from the peripheral portion 66.

The lower block 70 includes a separable sensing block 74 and an attachment block 90. The sensing block 74 is an example of a first block. The attachment block 90 is an example of a second block. The sensing block 74 includes the sensor 22. The sensing block 74 has the first end portion 72 selectively connectable to the lower end portion 61 or the upper end portion 62, and an end portion 71 connectable to an end portion 92 of the attachment block 90. The attachment block 90 includes the end portion 92 that is connectable to the end portion 71 and a third end portion 91 that is attachable to a fixing portion external to the sensor unit. The upper block 80 may be provided with a fourth end portion 82 attachable to a fixed portion external to the sensor unit.

The sensing block 74 has the end portion 71 disposed on the opposite side of the first end portion 72, and the attachment block 90 has the end portion 92 disposed on the opposite side of the third end portion 91. The end portion 71 and the end portion 92 have interconnecting structures that are separable from each other. The end portion 71 has a peripheral portion 77 formed to fit to the peripheral portion of the end portion 92. The peripheral portion 77 has an O-ring 75 attached thereto for blocking water from entering from the peripheral portion 77.

Figure 6:
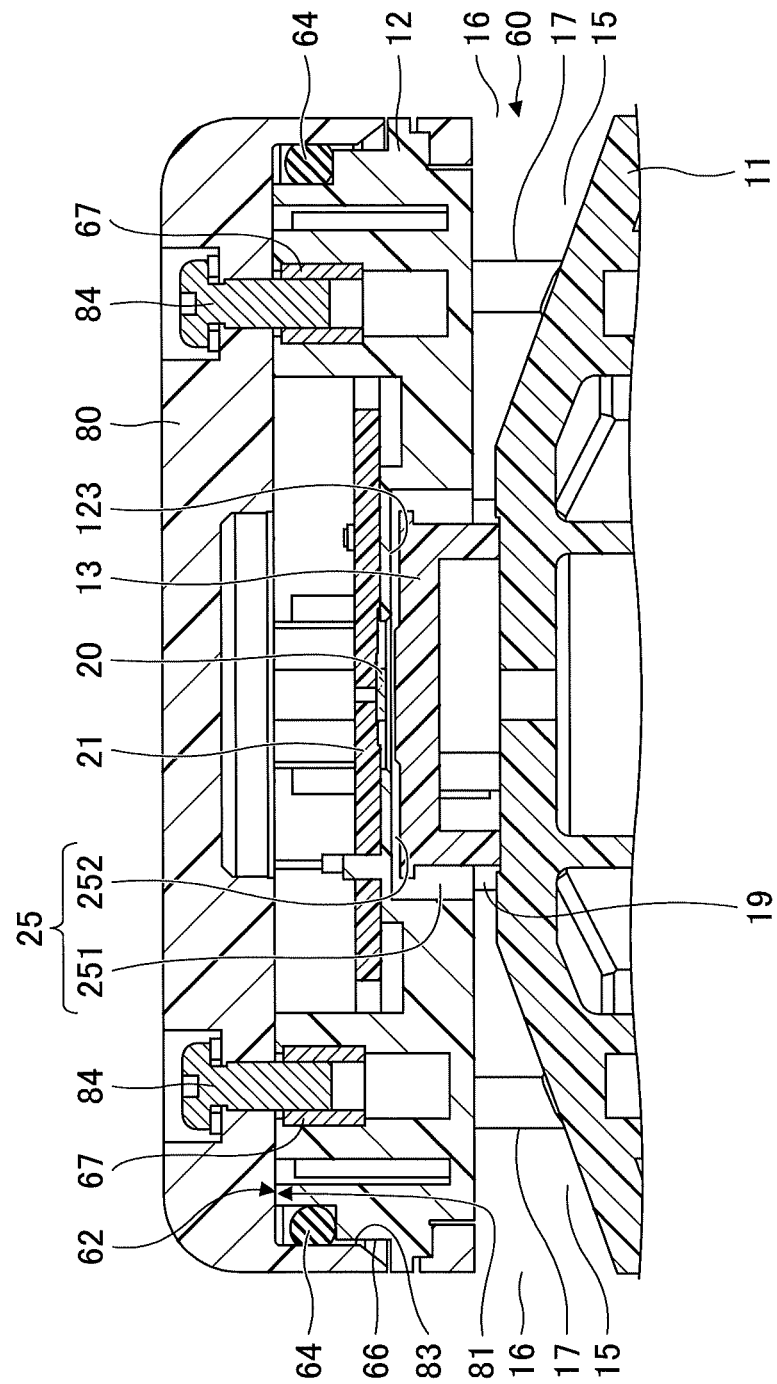
FIG. 6 is a cross-sectional view illustrating the specific example of an upper block.

FIG. 6 is a cross-sectional view illustrating a specific example of the upper block. By fastening at least one screw 84 to a nut 67 inserted into a flow passage plate 12 in the upper portion of the airflow measurement block 60, the upper block 80 is coupled to the airflow measurement block 60. When fastened by the screw 84, sealing is performed by the O-ring 64 to prevent water from entering between blocks. The fastening portion according to the screw 84 may be provided with rubber washers, resin potting, or the like to improve the waterproof property.

Figure 7:
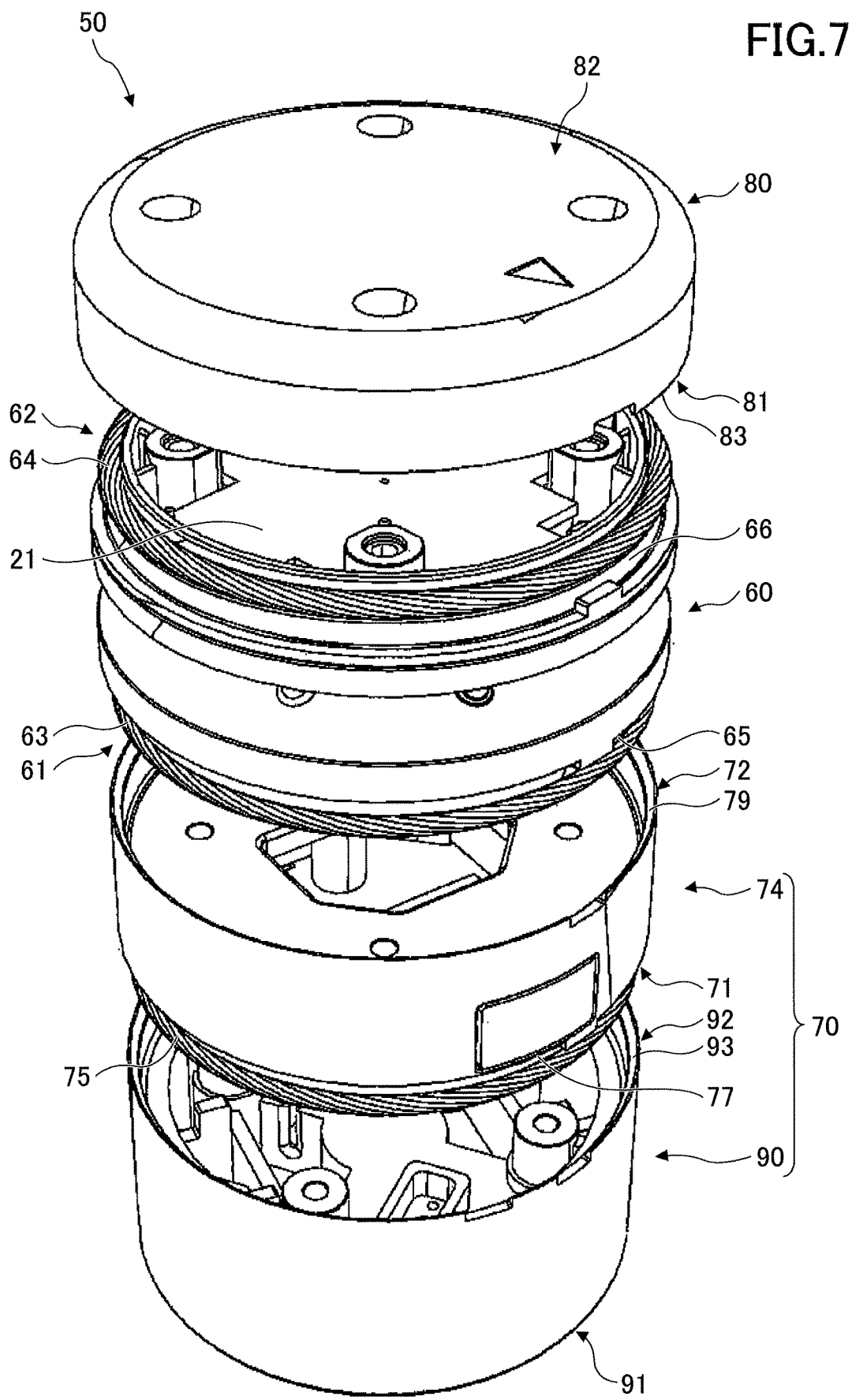
FIG. 7 is an exploded top perspective view illustrating the specific example of a sensor unit of an embodiment.
Figure 8:
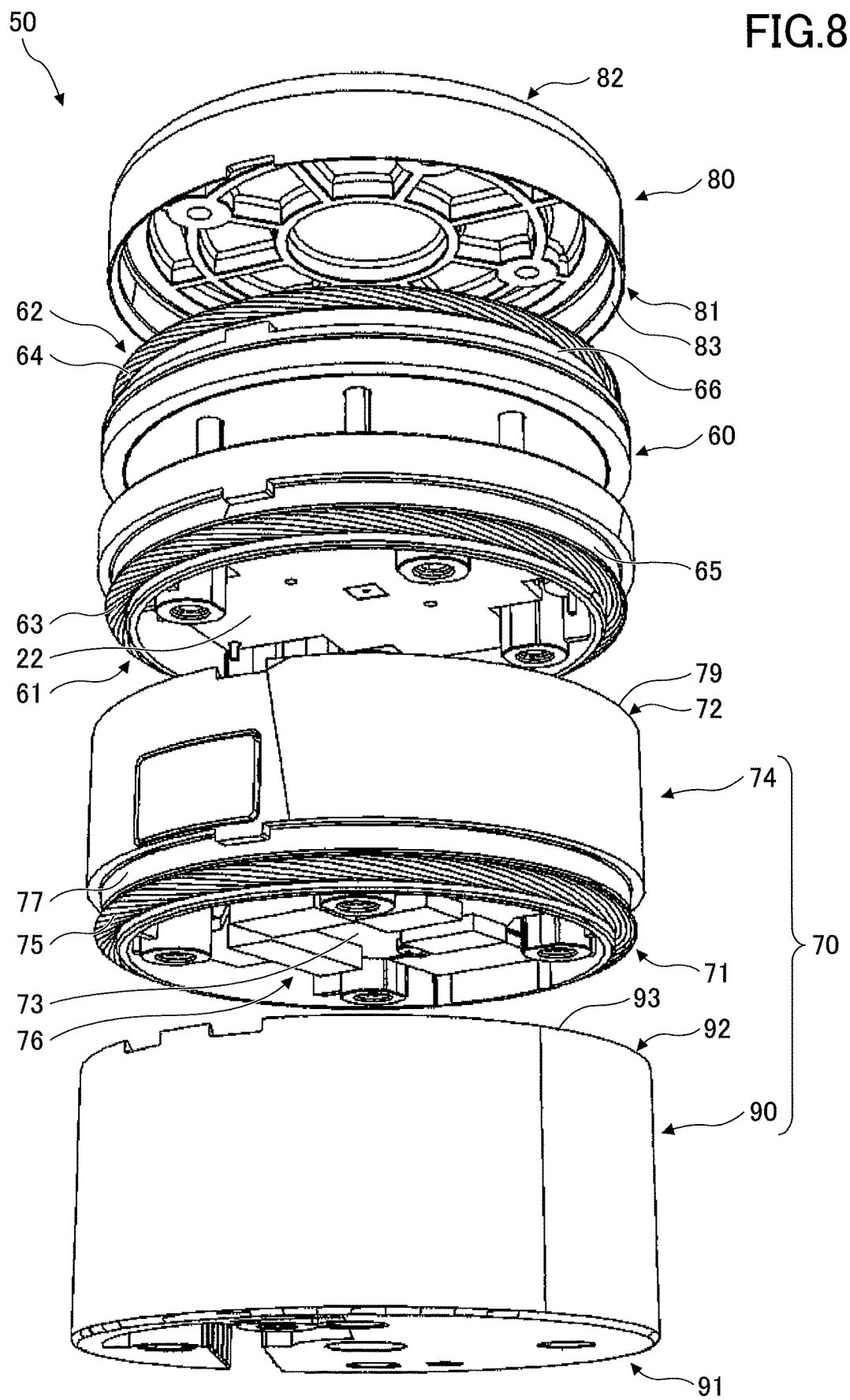
FIG. 8 is an exploded bottom perspective view (part 1) illustrating the specific example of a sensor unit according to an embodiment.
Figure 9:
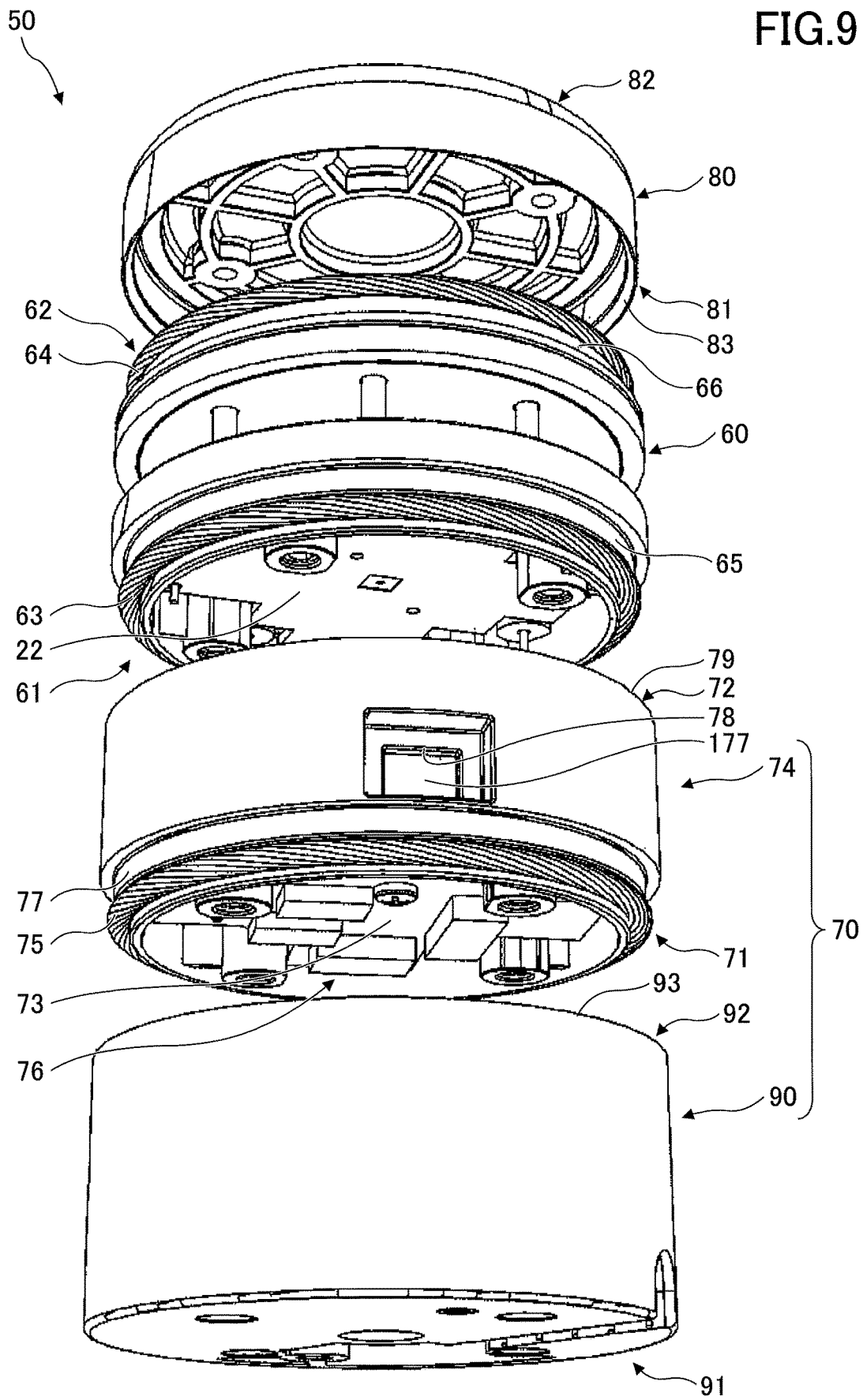
FIG. 9 is an exploded bottom perspective view (part 2) illustrating the specific example of a sensor unit according to an embodiment.
Figure 10:
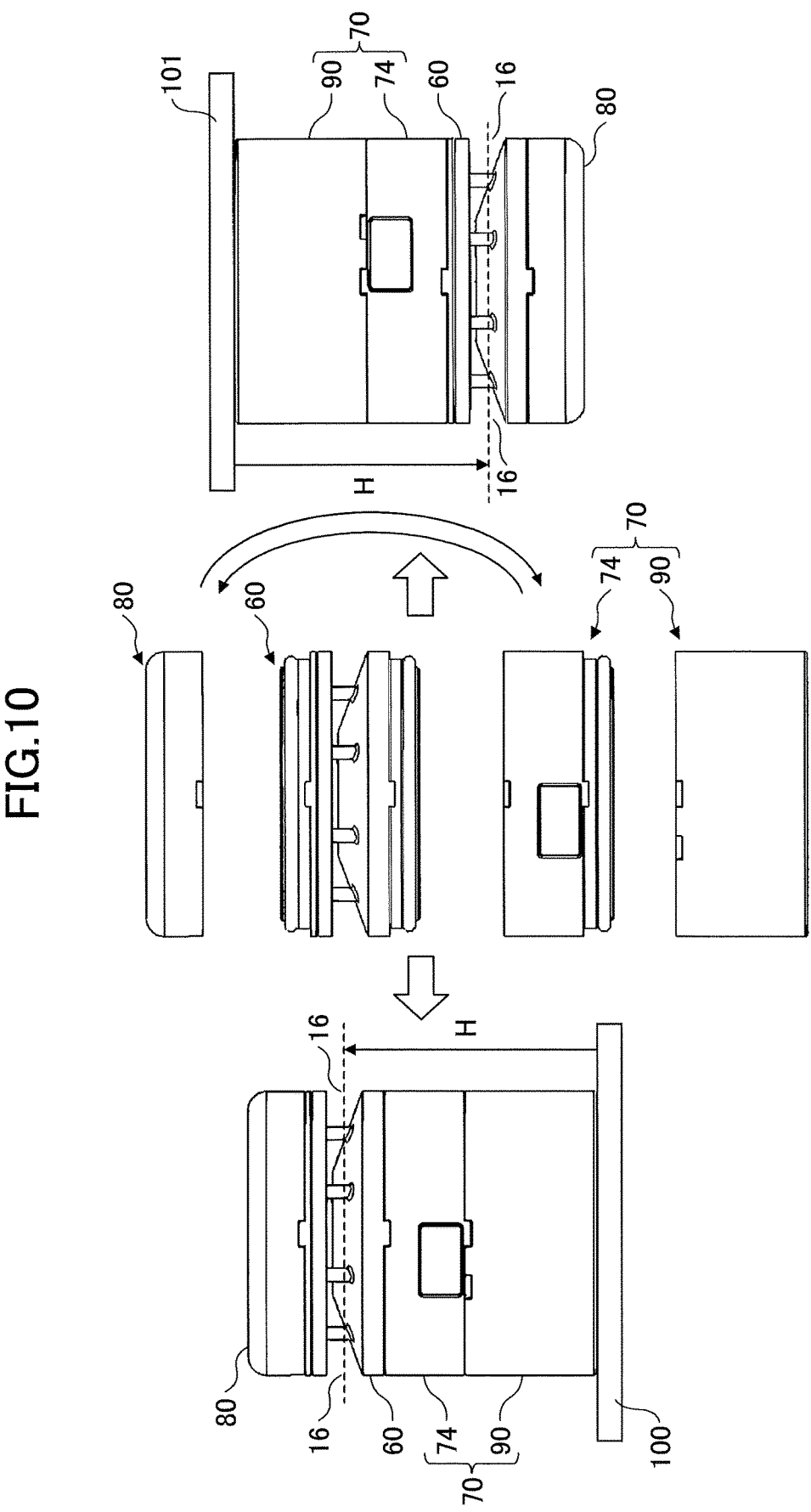
FIG. 10 is a diagram schematically illustrating an example of recombining components in a sensor unit of an embodiment.

FIG. 7 is an exploded top perspective view of the specific example of the sensor unit of an embodiment. FIG. 8 is an exploded bottom perspective view (part 1) illustrating the specific example of the sensor unit according to an embodiment. FIG. 9 is an exploded bottom perspective view (part 2) illustrating the specific example of the sensor unit according to an embodiment. FIG. 10 is a diagram schematically illustrating an example of recombining components in the sensor unit according to an embodiment.

Figure 11:
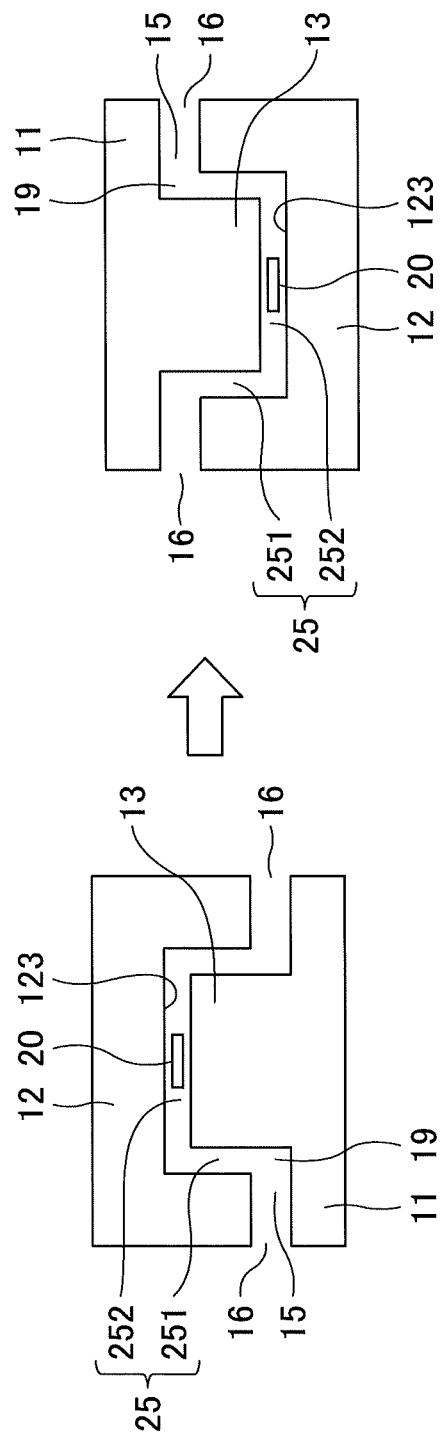
FIG. 11 is a diagram schematically illustrating a structural example of an airflow measurement block.

When the airflow sensor is used to detect the airflow from all directions of 360°, the fixing portion of the sensor unit 50 is either in the upper or lower direction, which is unlikely to interfere with the detection of the airflow. When the sensor unit 50 is fixed to a lower fixing portion such as a floor, a fixing table, a tripod, or the like, the sensor unit 50 can be fixed by using fixing screw holes 96 and 97 (see FIG. 19) for fixing the attachment block 90. However, if the sensor unit 50 were to be turned upside down and fixed to an upper fixing portion such as the ceiling by using the fixing screw holes 96 and 97 of the attachment block 90, the airflow measurement block 60 with the airflow sensor 20 would also be turned upside down. On the other hand, as illustrated in FIG. 6, the airflow sensor 20 is disposed in a space (branch flow passage 25) in communication with a flow passage opening 16 that opens to the outer periphery portion of the airflow measurement block 60, and the airflow sensor 20 is disposed at a height different from the height of the flow passage opening 16. Accordingly, if the airflow measurement block 60 were to be turned upside down as illustrated in FIG. 11, dust or water would accumulate in the flow passage in which the airflow sensor 20 is disposed, due to the structure. Although the sensor unit 50 may be fixed by using a screw hole used for fixing provided in the upper block 80, if a distance H from the fixing portion to the flow passage opening 16 were to change, the gas flow would change due to the influence of the fixing portion.

In order to solve such a problem, the sensor unit 50 according to the present embodiment has a structure in which the connection portions of the respective components have the same connection shape, and, therefore, the sensor unit 50 can be assembled upon inverting the blocks other than the airflow measurement block 60. Thus, as illustrated in FIG. 10, the fixing direction can be changed without changing the distance H between the flow passage opening 16 of the airflow measurement block 60 and the fixing portion 100 or the fixing portion 101.

Next, the configuration of the airflow measurement block 60, which is an example of the airflow measurement apparatus, will be described in more detail.

In the embodiment, measurement errors, which are caused by a difference in the inflow direction of gas into the sensor, are reduced, without increasing the size of the apparatus. In order to achieve this, the shape of the flow passage is devised so that the velocity of the airflow incorporated into the sensor is approximately uniform in all directions. "Gas" includes the atmosphere, gas of particular components, exhaust gas, etc. Hereinafter, a specific form of the airflow measurement block 60 (an airflow measurement apparatus 1) will be described with reference to the drawings.

Figure 12:
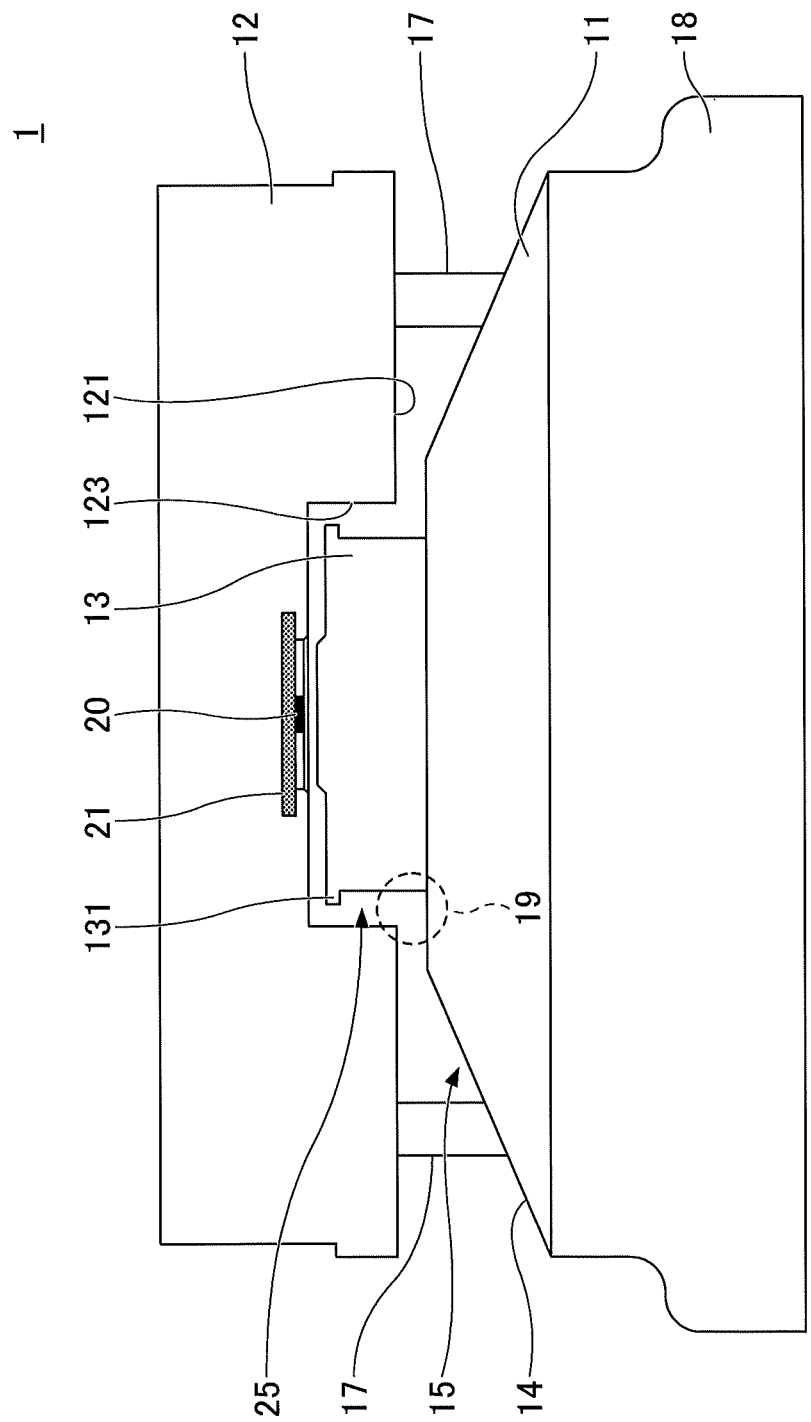
FIG. 12 is a schematic cross-sectional view of an airflow measurement apparatus of an embodiment.

FIG. 12 is a schematic cross-sectional view of the airflow measurement apparatus 1 of an embodiment. The airflow measurement apparatus 1 includes a first flow passage plate 11, a second flow passage plate 12 (flow passage plate 12), the airflow sensor 20 that is positioned in a substantially central portion of the in-plane direction facing a flow passage formed by the first flow passage plate 11 and the second flow passage plate 12, and a plurality of support posts 17. The first flow passage plate 11 and the second flow passage plate 12 are supported with a predetermined space therebetween, by the support posts 17. The airflow sensor 20 is disposed such that the sensing surface thereof comes into contact with the space in which the flow passage is formed.

The main portion of the airflow measurement apparatus 1 is formed on a base plate 18. The airflow measurement apparatus 1 is typically used with the base plate 18 being placed on a horizontal plane. The mounting surface of the airflow sensor 20 is preferably a plane parallel to the horizontal plane. The first flow passage plate 11 may be integrally formed with the base plate 18 or may be formed separately from the base plate 18.

As a feature of the embodiment, at least one of the first flow passage plate 11 and the second flow passage plate 12 has an outwardly inclined oblique surface 14 on a surface facing the other one of the first flow passage plate 11 and the second flow passage plate 12. In the example of FIG. 12, the oblique surface 14 is provided on the first flow passage plate 11. The second flow passage plate 12 has no oblique surface, and an opposing surface 121 facing the first flow passage plate 11 is parallel to the mounting surface of the airflow sensor 20.

An inclined flow passage 15 is formed by the oblique surface 14 of the first flow passage plate 11 and the opposing surface 121 of the second flow passage plate 12. The inclined flow passage 15 is an inflow and outflow passage that captures fluid from the surroundings into the airflow measurement apparatus 1, and discharges the fluid to the surroundings.

Another feature of the embodiment is that the branch flow passage 25 communicating with the inclined flow passage 15 is provided with a protrusion that protrudes into the branch flow passage 25 and that partially narrows the branch flow passage 25. The airflow sensor 20 is disposed at a higher position in the height direction of the airflow measurement apparatus 1, than a communicating portion 19 where the inclined flow passage 15 communicates with the branch flow passage 25. In the example of FIG. 12, the protrusion is formed as a flange 131 extending horizontally along the perimeter of a step or stage 13 provided in the first flow passage plate 11, or parallel to the mounting surface of the airflow sensor 20.

The stage 13 is, for example, a cylindrical step in which the flange 131 is formed along the circumference on the top surface of the stage 13. In accordance with the shape of the stage 13, the planar shape of the first flow passage plate 11 and the second flow passage plate 12 may be circular with the same axis as the stage 13.

The second flow passage plate 12 has a recess portion 123 in the center of the opposing surface 121 facing the first flow passage plate 11. The stage 13 is accommodated within the recess portion 123 with a space between the outer surface of the stage 13 and the second flow passage plate 12.

The oblique surface 14 of the frustum extends from the base of the stage 13 toward the outer circumference of the first flow passage plate 11, and the space between the oblique surface 14 and the opposing surface 121 of the second flow passage plate 12 is the inclined flow passage 15. The inclined flow passage 15 becomes narrow toward the stage 13, and communicates with the branch flow passage 25 at the base of the stage 13. The branch flow passage 25 is formed between the stage 13 and the recess portion 123 of the second flow passage plate 12.

As will be described later, by providing the oblique surface 14 and a protrusion (e.g., the flange 131) that protrudes into the branch flow passage 25 in the airflow measurement apparatus 1, the fluid flowing to the airflow sensor 20 can be made as uniform as possible in all directions so that turbulence is reduced and output errors are reduced.

Figure 13B:
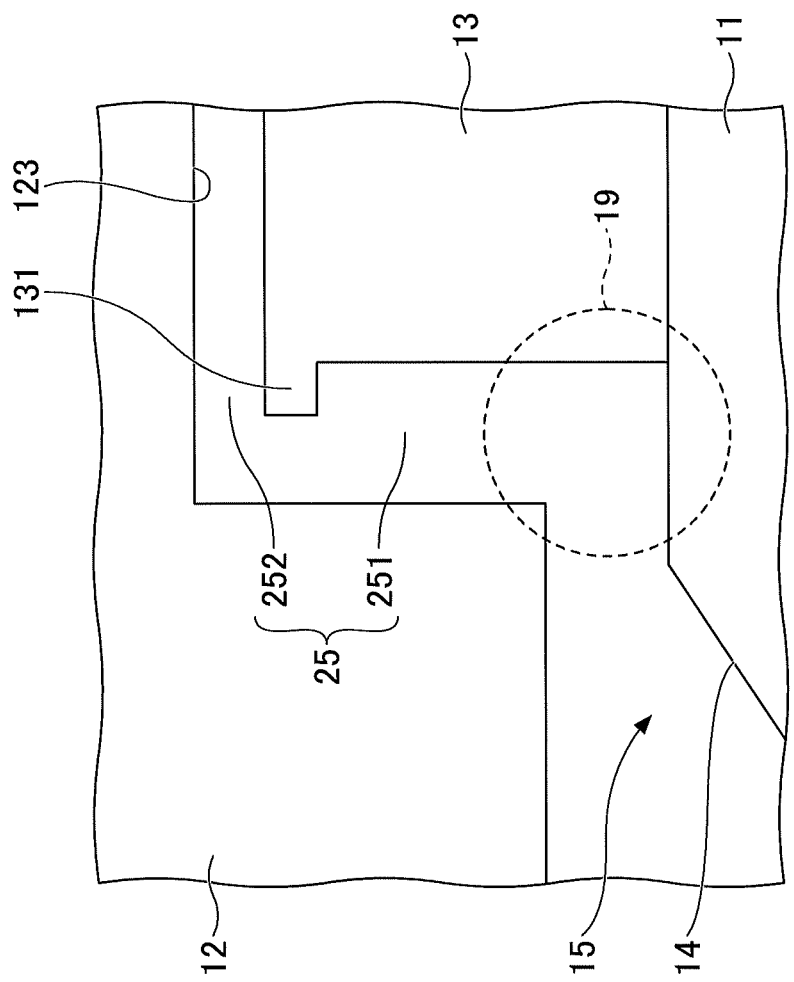

FIGS. 13A and 13B are diagrams for indicating an enlarged view of the main portion of the airflow measurement apparatus 1. FIG. 13A is a schematic cross-sectional view of the airflow measurement apparatus 1. FIG. 13B is an enlarged view of an area A surrounded by a circle in FIG. 13A. The inclined flow passage 15 having the oblique surface 14 communicates with the branch flow passage 25 at the communicating portion 19 on the base side of the stage 13. The branch flow passage 25 includes a vertical flow passage 251 extending between the side surface of the stage 13 and the recess portion 123 of the second flow passage plate 12, and a horizontal flow passage 252 extending between the top surface of the stage 13 and the recess portion 123.

The flange 131 of the stage 13 protrudes into the space between the vertical flow passage 251 and the horizontal flow passage 252, and narrows the width of the branch flow passage 25 to some extent.

The airflow sensor 20 attached to a substrate 21 is disposed facing the branch flow passage 25, above the communicating portion 19 of the inclined flow passage 15, in the height direction of the airflow measurement apparatus 1. In the example illustrated in FIGS. 12 to 13B, the airflow sensor 20 is disposed in the recess portion 123 of the second flow passage plate 12 such that the sensing surface of the airflow sensor 20 is in contact with the horizontal flow passage 252. By this configuration, the fluid captured into the airflow measurement apparatus 1 from the inclined flow passage 15 flows from the communicating portion 19 through the branch flow passage 25 to contact the airflow sensor 20, and then flows from the opposite side of the branch flow passage 25 to the inclined flow passage 15, and is discharged outside the airflow measurement apparatus 1.

Figure 14:
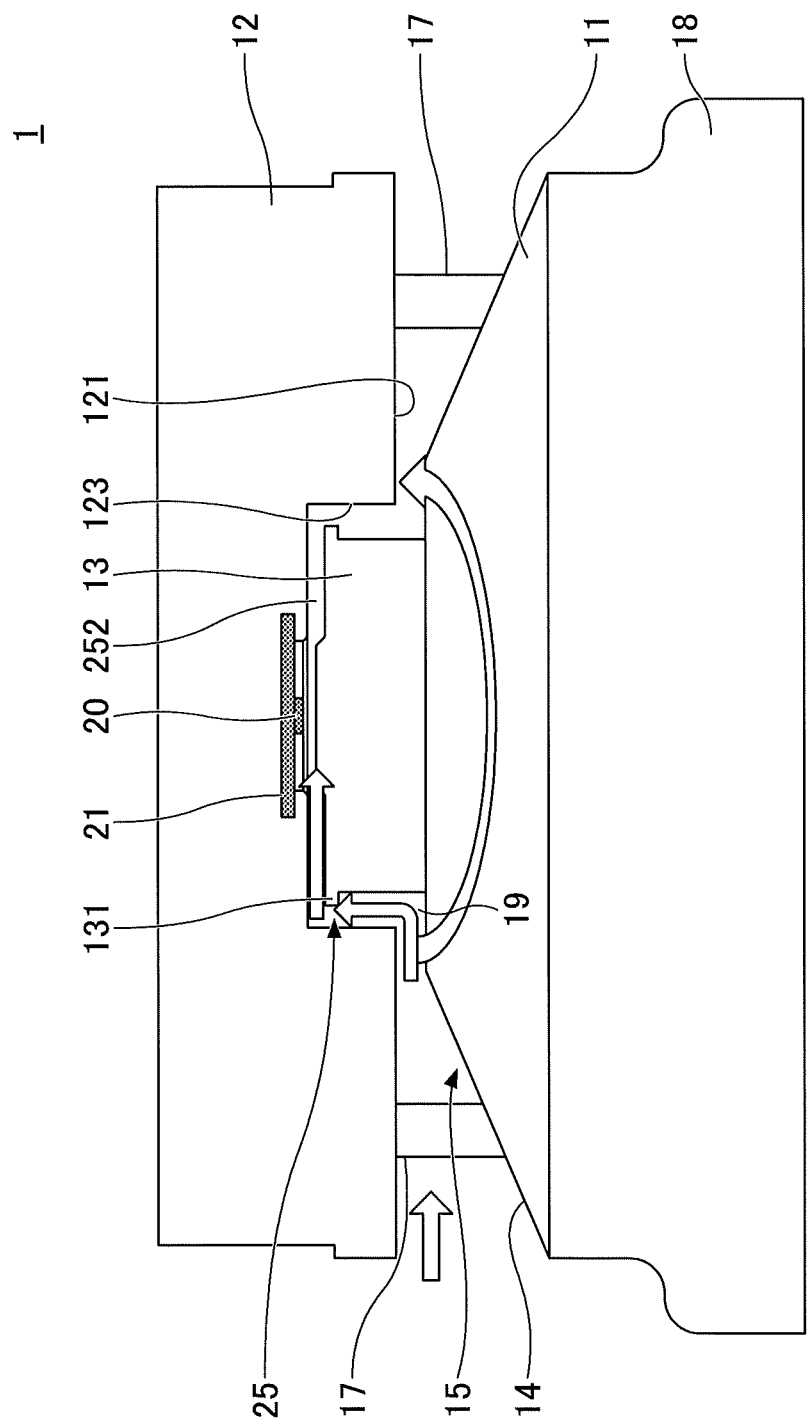
FIG. 14 is a diagram illustrating the flow of gas into the airflow measurement apparatus of FIG. 12.

FIG. 14 is a diagram illustrating the flow of gas into the airflow measurement apparatus 1. The gas flowing from between the support posts 17 into the airflow measurement apparatus 1 is directed toward the center along the inclined flow passage 15. The inclined flow passage 15 is narrowed toward the center, and at the base of the stage 13, a portion of the gas passes along the oblique surface 14 to the opposite side of the inclined flow passage 15, and the other portion of the gas flows from the communicating portion 19 into the branch flow passage 25.

When gas flows in between the two support posts 17, the incoming gas is sensed by the airflow sensor 20 in a nearly intact condition with hardly any turbulence. When gas flows in from the front of the support post 17, in a conventional configuration, the gas separates at the support post 17, and turbulence occurs on the inner side of the support posts 17, which would cause an error in the output of the airflow sensor 20, making it difficult to accurately measure the wind direction or wind velocity in all directions.

On the other hand, in the configuration of the present embodiment, the oblique surface 14 is provided in the inflow and outflow passage, thereby forming the inclined flow passage 15. The gas that flows in from the front of the support post 17, and also the gas that flows in from between two support posts 17, move along the oblique surface 14, and are therefore equalized to some extent (first stage of equalization).

The angle of the oblique surface 14 is suitably designed to provide an effect of equalization in the flow velocity or flow rate in all directions, depending on the environment in which the airflow measurement apparatus 1 is used, the range of flow velocity or flow rate to be measured, the sensitivity of the airflow sensor 20, and the like. As an example, the inclination angle of the oblique surface 14 to the horizontal plane is 20° to 60°, more preferably 30° to 45°. If the angle of inclination is too small, the influence of turbulence, caused by the difference in the direction of inflow, cannot be sufficiently mitigated. If the angle of inclination is too large, the size of the apparatus increases in the height direction and the placement becomes unstable.

The gas captured into the airflow measurement apparatus 1 flows from the inclined flow passage 15 into the branch flow passage 25 and flows upwardly along the side surface of the stage 13, such that variations in the flow velocity or flow rate caused by the influence of the support posts 17 is further mitigated. Also, when the airflow enters the horizontal flow passage 252 from the vertical flow passage 251, the airflow turns at the flange 131, and, therefore, the airflow is further equalized (second stage of equalization).

In this example, the gas that has risen along the side surface of the stage 13 flows outward along the bottom surface of the flange 131 and then flows into the horizontal flow passage 252 from between the flange 131 and the side wall of the recess portion 123. In this process, it is possible to reduce the variation in the flow velocity caused by the difference in the inflow direction of the gas captured into the airflow measurement apparatus 1, and to minimize the measurement error in all directions.

As a secondary effect, by providing the flange 131, water droplets, dust, or the like can be inhibited from entering the horizontal flow passage 252 in which the airflow sensor 20 is disposed.

As the protruding configuration protruding into the branch flow passage 25, instead of the horizontally extending flange 131, a protruding wall extending in a vertical direction on the outer periphery of the stage 13, may be provided. In this case, the width of the horizontal flow passage 252 is narrowed on the inflow/outflow side of the horizontal flow passage 252. The fluid that has risen along the side wall of the stage 13 passes over the protrusion and enters the horizontal flow passage 252. As a result, variations in the flow velocity, caused by the presence or absence of the support posts 17 or by the influence of turbulence, are equalized in all directions, such that it can be expected that measurement errors depending on the inflow direction can be reduced.

By providing the flange 131, the flow velocity of the gas sensed by the airflow sensor 20 is slightly lower than the actual flow velocity. With regard to this matter, by measuring the change in the flow velocity caused by passing the flange 131 and performing calibration in advance, it is possible to calculate a correct measurement value from the detection result of the airflow sensor 20, and output the correct measurement value. Also when a vertical protrusion is provided instead of the flange 131, the detected flow velocity is slightly lower than the actual flow velocity. In this case also, by performing calibration in advance, the correct measurement value can be output.

Figure 15A:
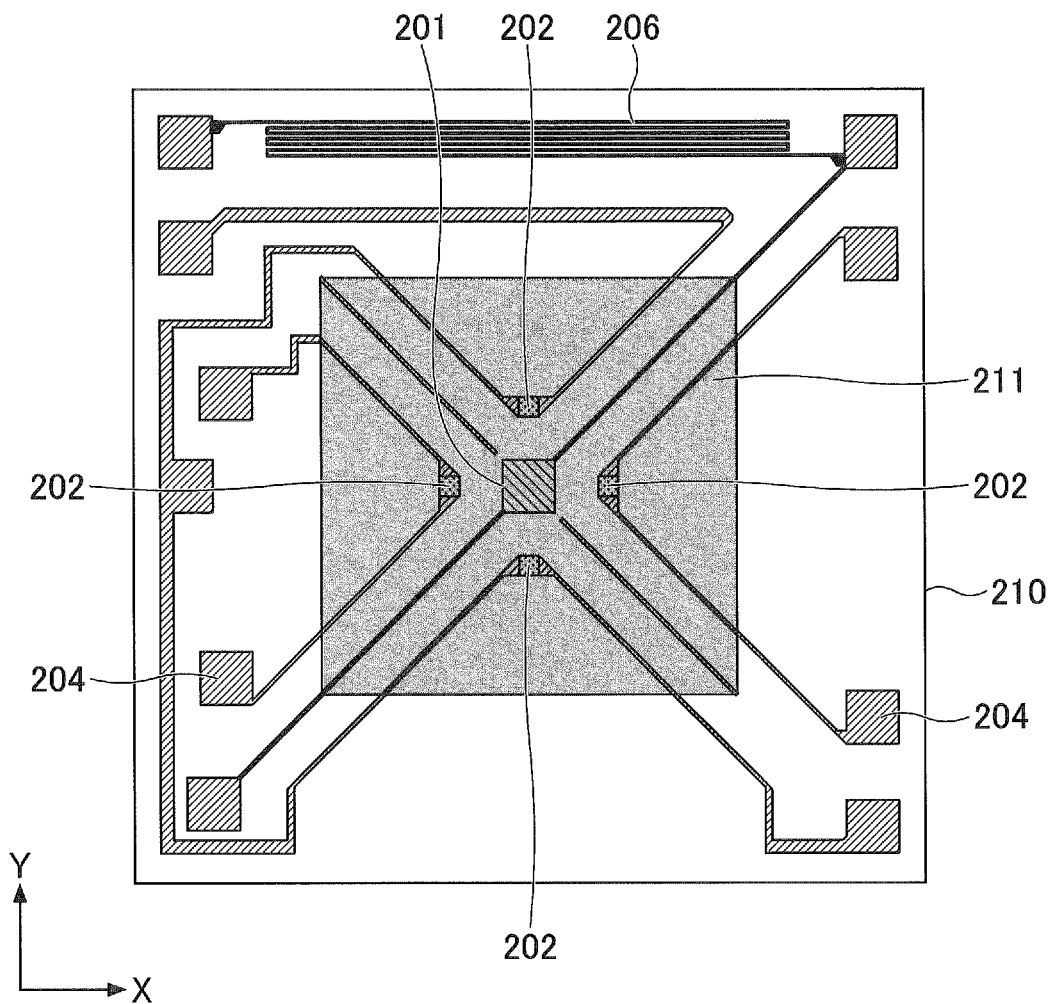
FIGS. 15A and 15B illustrate an example of the configuration of an airflow sensor used in the airflow measurement apparatus.
Figure 15B:
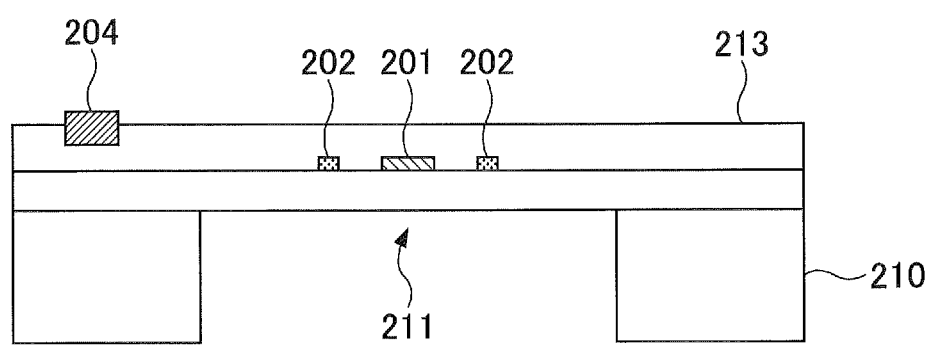

FIGS. 15A and 15B illustrate an example of the configuration of the airflow sensor 20 used in the airflow measurement apparatus 1. FIG. 15A is a plan view, and FIG. 15B is a schematic cross-sectional view. The airflow sensor 20 includes a heating resistor 201 and a plurality of temperature detectors 202 disposed around the heating resistor 201. The heating resistor 201 and the temperature detectors 202 are disposed on a diaphragm 211 formed on a chip substrate 210. The chip substrate 210 is a semiconductor substrate made of, for example, silicon, which is easy to etch. The diaphragm 211 is an insulating multilayer film. The bottom layer of the multilayer film may include a semiconductor layer.

The temperature detectors 202 are evenly disposed around the heating resistor 201 to detect the direction and the flow rate of the airflow. In the example of FIG. 15A, four temperature detectors 202 are disposed in a positional relationship perpendicular to each other. In this case, the pair of temperature detectors 202 disposed in the X direction may detect a change in the temperature distribution in the X direction, and the pair of temperature detectors 202 disposed in the Y direction may detect a change in the temperature distribution in the Y direction.

The heating resistor 201 is formed of platinum (Pt), nichrome (NiCr), molybdenum silicide ($MoSi_2$), tungsten silicide ($WSi_2$), polysilicon, and the like. The temperature detector 202 is formed of, for example, vanadium oxide. The heating resistor 201 and each temperature detector 202 are electrically connected to a pair of corresponding electrode pads 204, and are entirely covered with a protective film 213.

The electrode pad 204 is formed on the chip substrate 210 outside the diaphragm 211, and is exposed from the protective film 213. Above the chip substrate 210, a temperature sensor 206 connected to an external bridge circuit is provided.

When a current is applied to the heating resistor 201 to generate heat, the temperature of the diaphragm 211 rises. If no fluid is flowing in the space in contact with the airflow sensor 20, the temperature distribution of the diaphragm 211 is uniform, and the output of the pair of temperature detectors 202 facing each other by interposing the heating resistor 201 is uniform.

When a fluid flows in contact with the airflow sensor 20, the downstream side is heated to a higher temperature than that of the upstream side, resulting in a temperature distribution in the diaphragm 211. Therefore, the voltage value, which is extracted from the electrode pad connected to the temperature detector 202, changes. From the direction and the rate of change of the voltage change, the direction and the flow velocity of the airflow can be calculated.

The airflow sensor 20 is die bonded to the substrate 21 using an adhesive or the like. The chip substrate 210 and the substrate 21 are electrically connected to each other by using wire bonding and through vias. The substrate 21 is disposed at the center of the airflow measurement apparatus 1 such that the element surface of the airflow sensor 20 faces the flow passage (e.g., the horizontal flow passage 252 of the branch flow passage 25) at a position higher than the inclined flow passage 15.

In the conventional flow passage configuration, depending on whether a support post exists in the inflow direction to the airflow sensor 20, the temperature distribution would become erroneous due to the influence of turbulence, and an error would occur in the output value of the airflow sensor 20. In the airflow measurement apparatus 1 of the embodiment, the airflow is equalized in two stages, by the oblique surface 14 of the inclined flow passage 15 and the flange 131 provided in the branch flow passage 25. Accordingly, it is possible to inhibit the variation in the flow velocity due to the difference in the inflow direction, and to reduce measurement errors in all directions.

Figure 16:
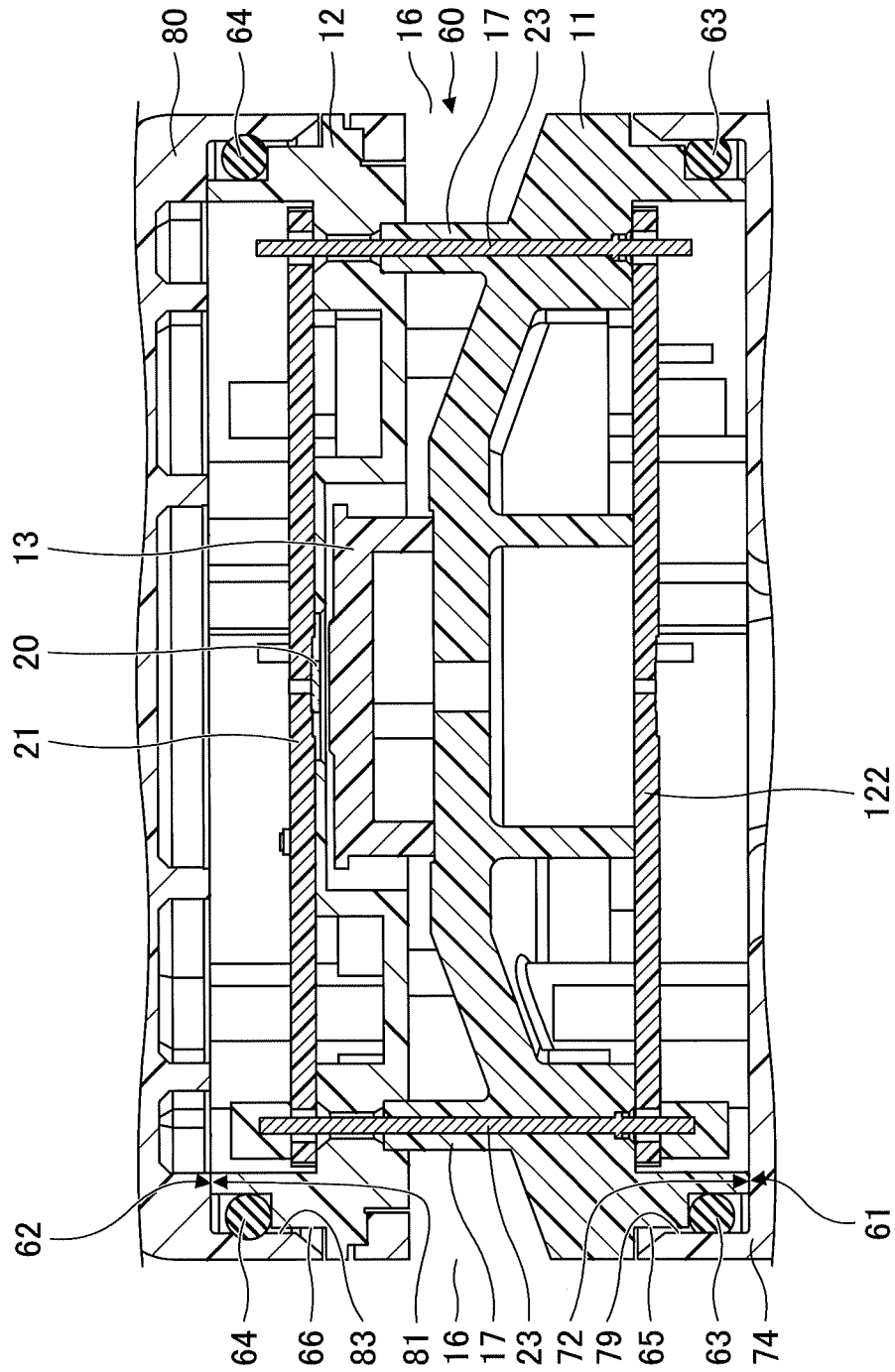
FIG. 16 is an enlarged partial sectional view of an airflow measurement block.

FIG. 16 is an enlarged partial sectional view of an airflow measurement block. The airflow measurement block 60 includes a first substrate 21 (substrate 21) that is mounted on the second flow passage plate 12 and that has the airflow sensor 20 mounted thereon; and a second substrate 122 that is mounted on the first flow passage plate 11 and that is connected to the first substrate 21 via conductors 23 passing through the support posts 17. By having the second substrate 122, a desired function (e.g., an interface function for connecting to a third substrate 73 described below) can easily be added to the second substrate 122, thereby improving versatility and extensibility. Also, the conductor 23 passes through at least one support post 17, and, therefore, turbulence in the airflow can be prevented compared to a configuration in which the conductor 23 would extend outside of the support post 17.

Figure 17:
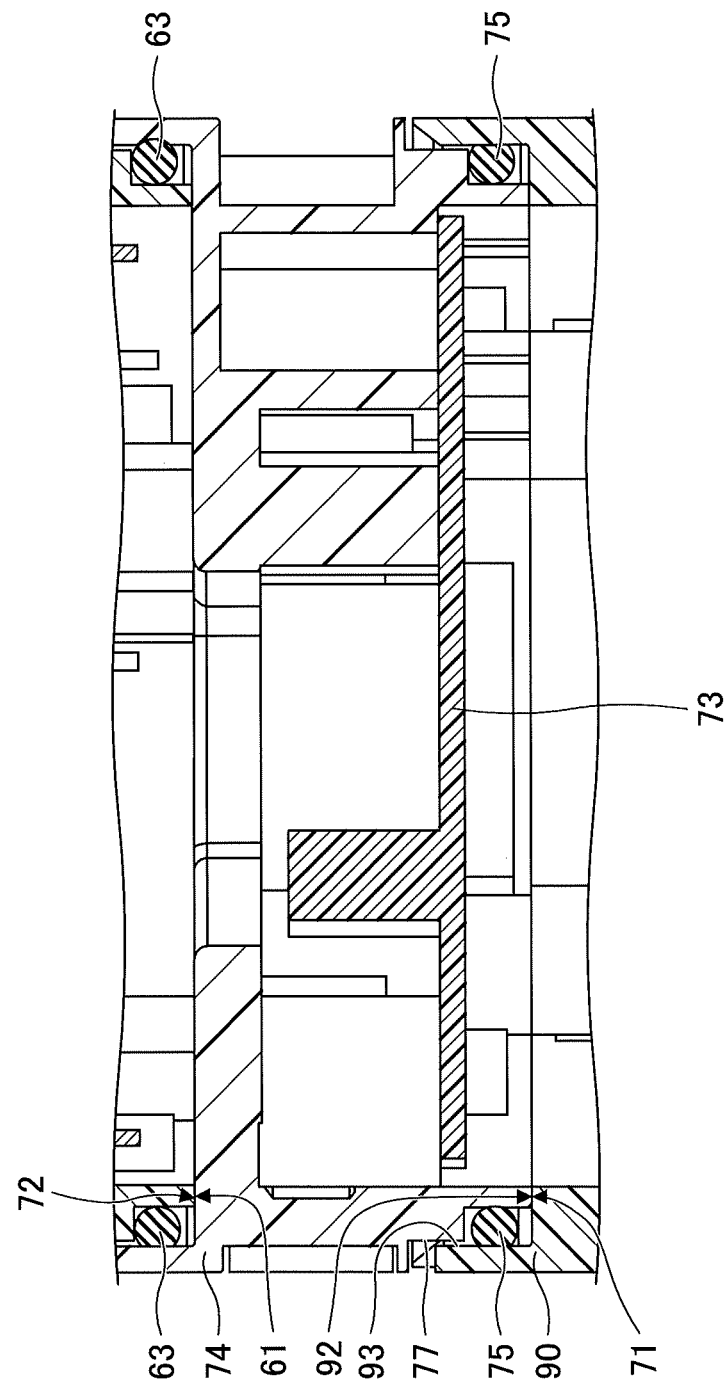
FIG. 17 is an enlarged partial sectional view of a sensing block.

FIG. 17 is an enlarged partial sectional view of the sensing block. The sensing block 74 may have the third substrate 73 that is electrically connected to the second substrate 122. At least one sensor 22 may be mounted on the third substrate 73. In the third substrate 73, a microcomputer that is an example of a controller, may be mounted. The microcomputer acquires sensor signals from the airflow sensor 20 through the conductors 23 and the second substrate 122 and acquires sensor signals from the sensor 22. The microcomputer can measure the wind direction or the wind velocity based on sensor signals from the airflow sensor 20, and can measure the environmental information, which is the detection target of the sensor 22, based on the sensor signals from the sensor 22.

FIG. 18 is a perspective view of the sensing block with the third substrate removed. Porous sheets 177, such as PTFE sheets, are applied to interface surfaces 178 inside and outside the housing, for sensing the exterior of the housing with at least one sensor 22 (e.g., a temperature sensor, a humidity sensor, or a pressure sensor). Accordingly, the temperature, the humidity, and the pressure can be sensed while implementing a waterproof property.

Figure 19:
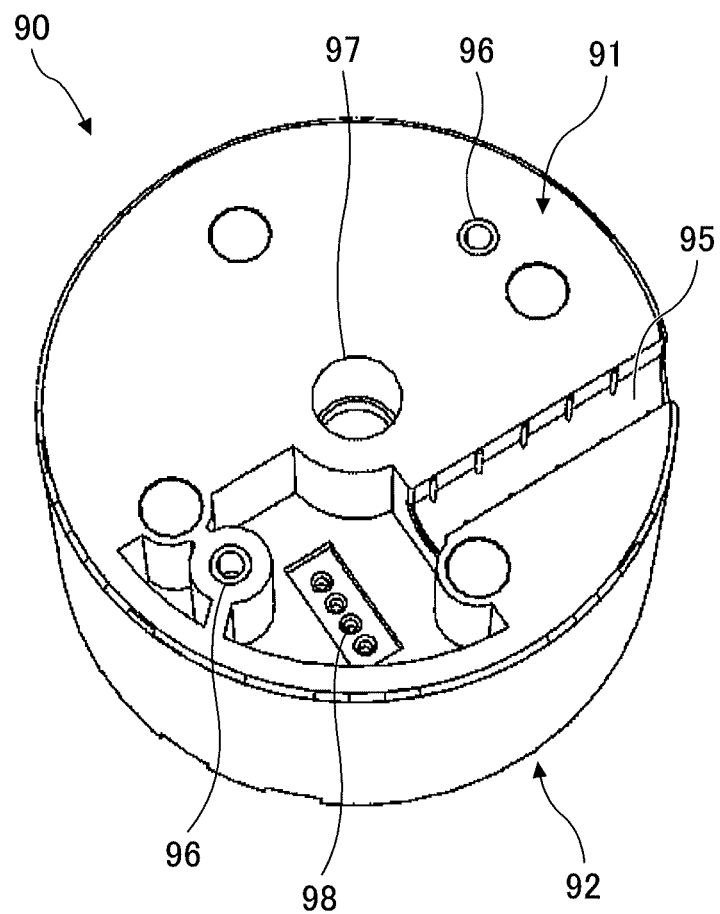
FIG. 19 is a perspective view from the bottom side of an attachment block.

FIG. 19 is a perspective view from the bottom side of the attachment block. The attachment block 90 is fastened to the sensing block 74, for example, with at least one screw. The third end portion 91 of the attachment block 90 is provided with draw-out holes 98 for drawing out an internal cable inside the housing to the outside of the housing, and a cable guide 95 for guiding a cable 94 (see FIG. 4) drawn out from the draw-out holes 98. The draw-out holes 98 are connected to the third substrate 73 of the sensing block 74 via an internal cable within the housing. After the cable 94 is drawn out from the draw-out holes 98, by filling the periphery of the draw-out holes 98 and the cable 94 with resin, waterproofing can be improved. The inside of the cable 94 includes, for example, a power line connected to an external power source or a communication line connected to an external device.

As described above, in the present embodiment, the connection portions of each block have the same connection shape, so that it is possible to add a block or make changes in a block while maintaining the waterproof property. Accordingly, it is possible to change the combination of blocks depending on changes in the environment in which the sensor unit is used, such as adding other sensors 22 such as a carbon dioxide sensor and a lightning sensor, changing to radio communication, and changing the power supply method.

Next, other specific examples of the sensor unit according to the present embodiment are described.

Figure 20:
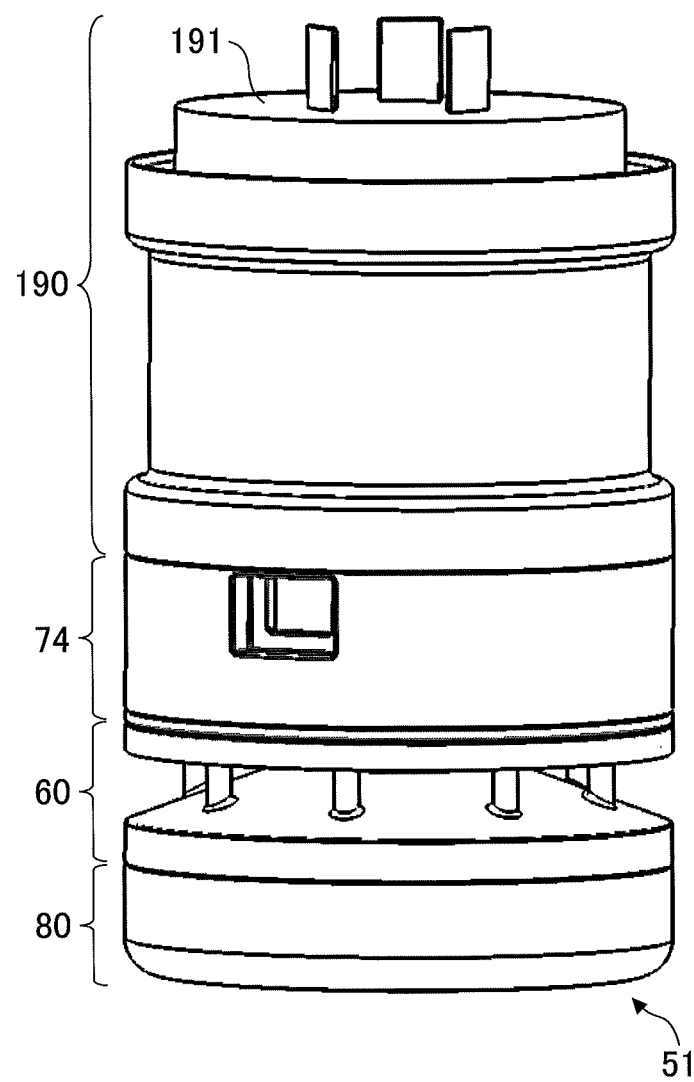
FIG. 20 is a diagram illustrating a second specific example of a sensor unit.

FIG. 20 is a diagram illustrating a second specific example of the sensor unit. A sensor unit 51 has an attachment block 190 connected, instead of the attachment block 90 of FIG. 4. At the end portion of the attachment block 190, a power socket 191 is provided. By attaching the power socket 191 to an upper fixing portion such as the ceiling, the sensor unit 51 can be fixed to the upper fixing portion, and power supply can be received from the upper fixing portion.

Figure 21:
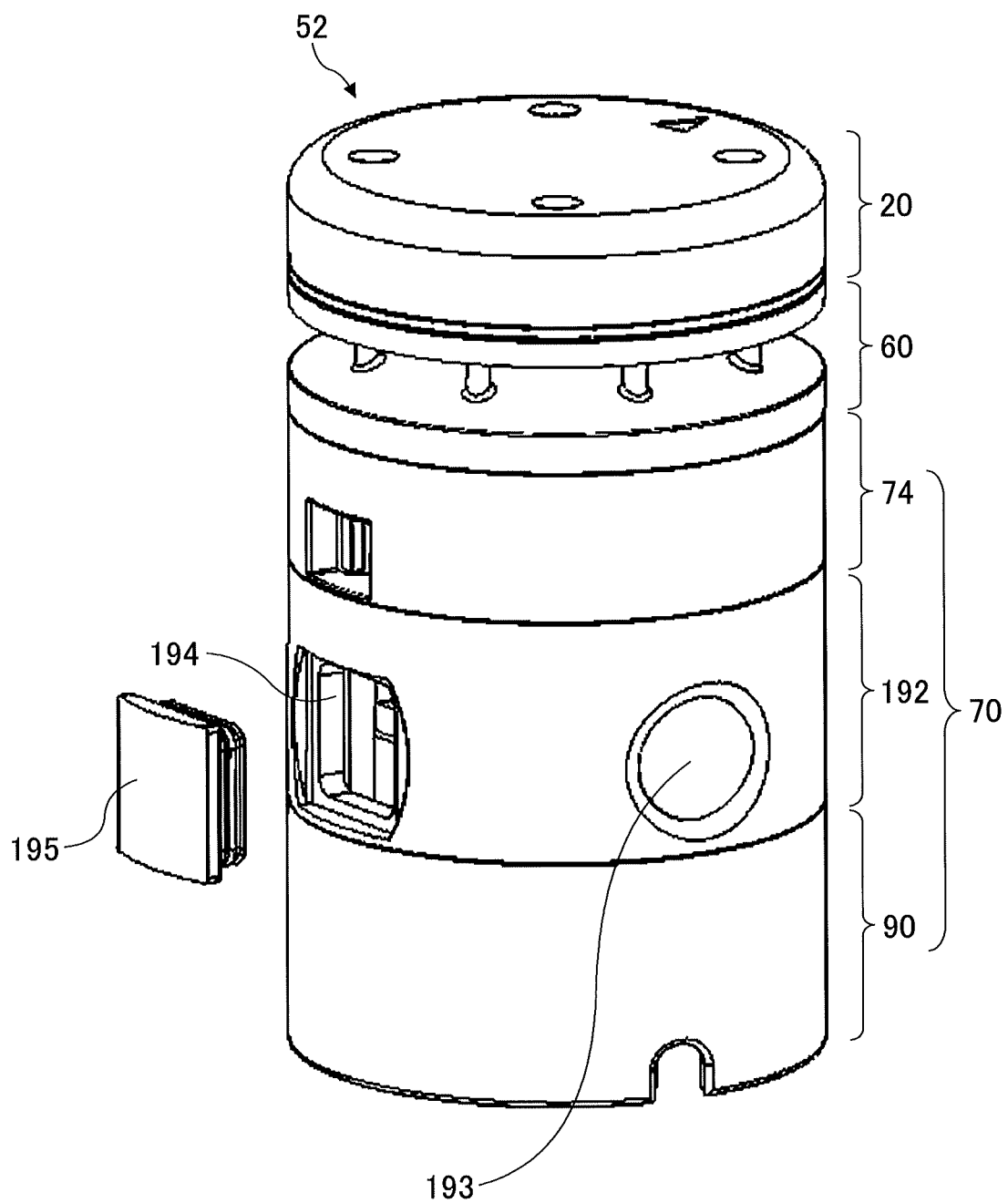
FIG. 21 is a diagram illustrating a third specific example of a sensor unit.

FIG. 21 is a diagram illustrating a third specific example of the sensor unit. A sensor unit 52 has a configuration in which the lower block 70 can be further separated into three blocks. The lower block 70 includes the sensing block 74, a power supply block 192, and the attachment block 90. The power supply block 192 has a built-in battery that can be charged from outside via a USB connector 194. When the USB connector 194 is not in use, a waterproof cap 195 is fit to the side of the power supply block 192, such that waterproofing is ensured. A touch sensor 193, which turns the power of the sensor unit 52 on or off, is provided on the side surface of the power supply block 192, thereby enabling the power of the sensor unit 52 to be turned on and off while the waterproofing is secured. The sensor unit 52 is connected to the outside in a wired or wireless manner.

Figure 22:
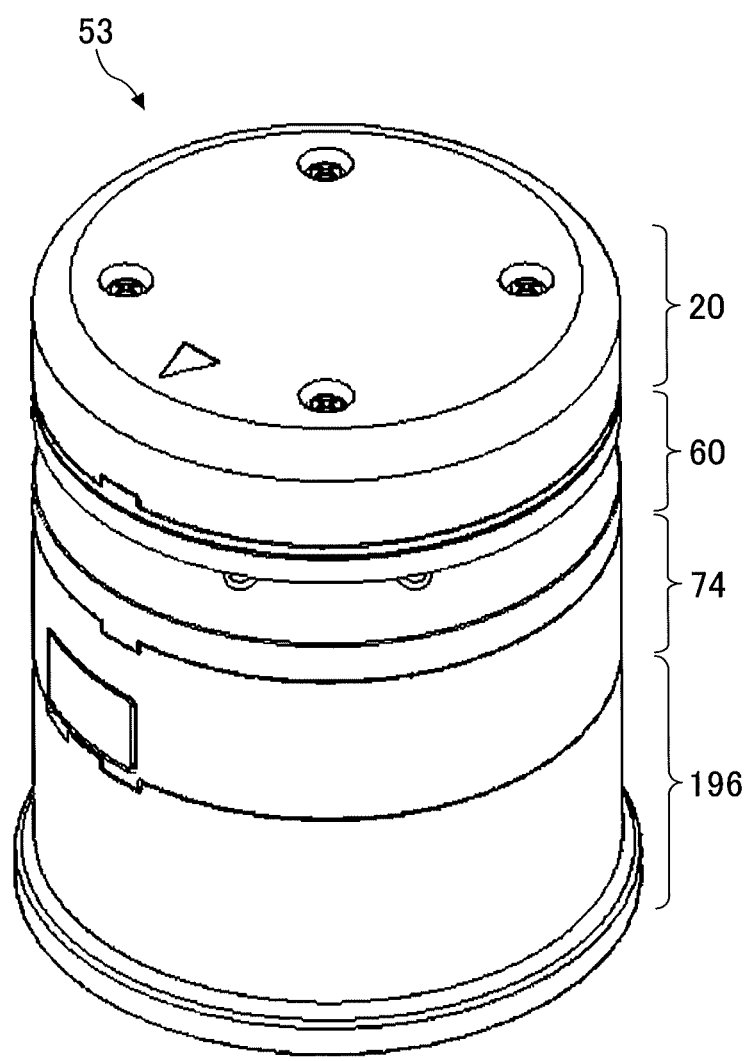
FIG. 22 is a top perspective view of a fourth specific example of a sensor unit.
Figure 23:
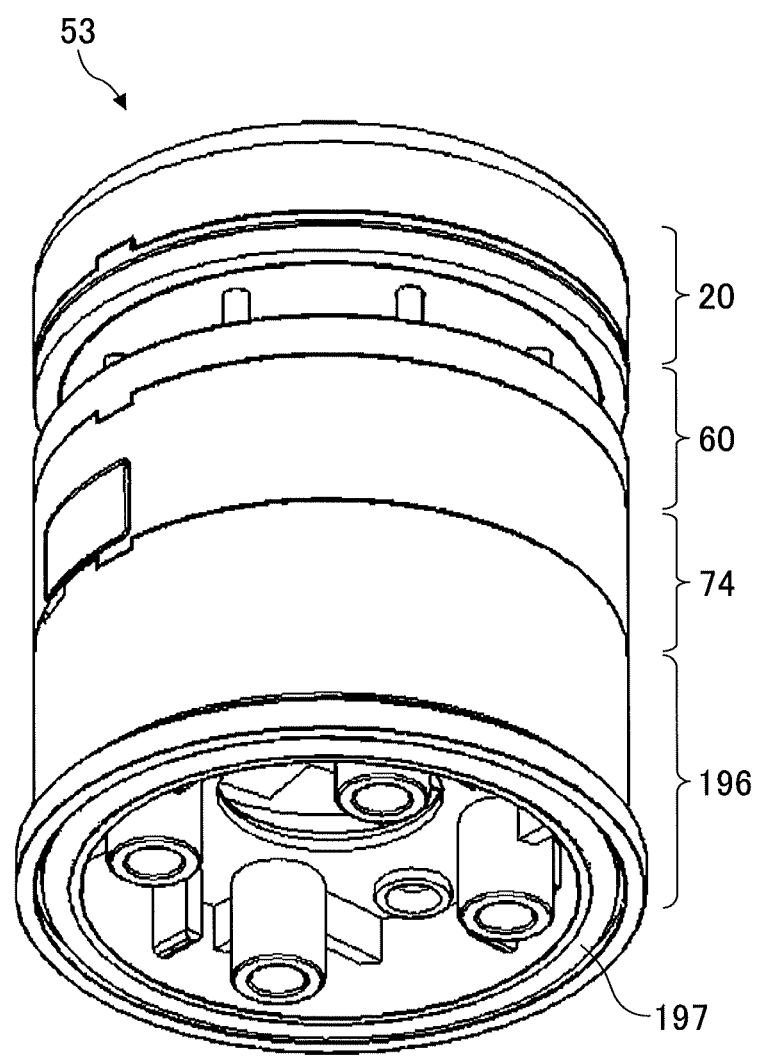
FIG. 23 is a bottom perspective view of the fourth specific example of a sensor unit.
Figure 24:
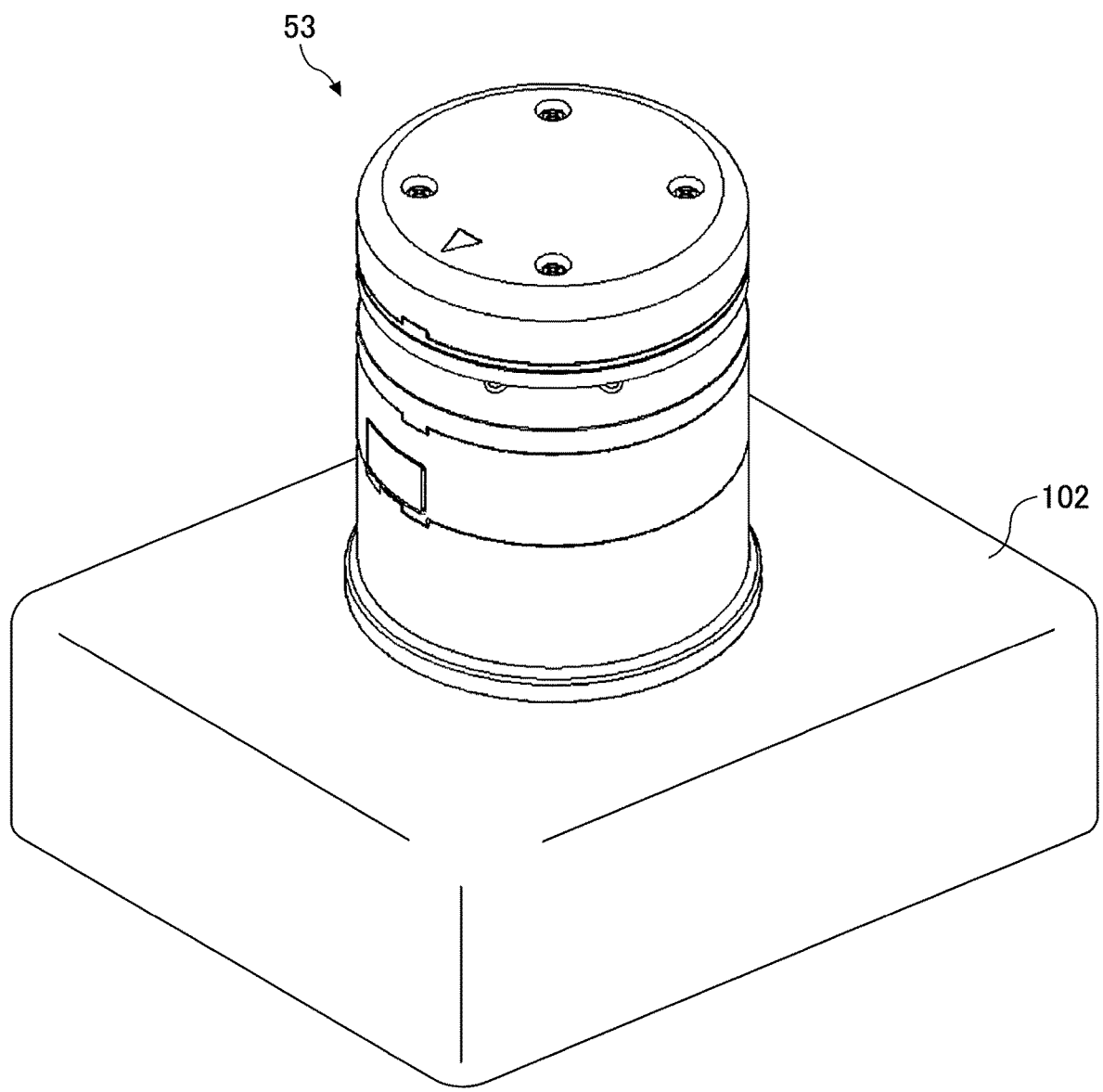
FIG. 24 is a perspective view of the fourth specific example of a sensor unit attached to a fixing portion.

FIG. 22 is a top perspective view of a fourth specific example of a sensor unit. FIG. 23 is a bottom perspective view of the fourth specific example of the sensor unit. FIG. 24 is a perspective view of the sensor unit attached to a fixing portion. A sensor unit 53 has an attachment block 196 with a waterproof configuration at the interface with a fixing portion 102. The attachment block 196 ensures waterproofing of the sensor unit 53 and the cable 94 by an O-ring 197 provided at an end portion that is the interface with the fixing portion 102. The sensor unit 53 is attachable to the fixing portion 102 by using the fixing screw holes 96 and 97, as illustrated in FIG. 19.

According to each of the embodiments described above, a sensor unit and an airflow measurement apparatus having high versatility and high extensibility can be provided.

Although the sensor unit and the airflow measurement apparatus have been described in accordance with the embodiments described above, the present invention is not limited to the above-described embodiments. Various modifications and improvements, such as combinations and substitutions with some or all of the other embodiments, may be made within the scope of the present invention.

For example, the flange 131 protruding horizontally within the branch flow passage 25 may be replaced with a protrusion protruding vertically to narrow the width of the horizontal flow passage 252. The planar shape of the first flow passage plate 11 and the second flow passage plate 12 is not limited to a circular shape and may be a polygon such as an octagon, a decagon, or the like. The support post 17 is not limited to a cylinder and may be a polygonal cylinder. In this case, by positioning the vertices of the prism in the gas inflow direction, separation of the fluid can be reduced. The stage 13 is preferably a cylindrical stage, but even when a polygonal stage is used, it is possible to achieve fluid equalization and a reduction in measurement errors with the use of a protrusion or a flange.

The airflow measurement apparatus measures at least one of the wind direction and wind velocity, but the airflow measurement apparatus can also measure the flow rate by multiplying the wind velocity by the cross-section of the flow passage. The airflow measurement apparatus of an embodiment can reduce measurement errors, which are caused by variations in the flow velocity, in all directions, with a stable, compact shape.

The number of airflow sensors is not limited to one, and there may be a plurality of airflow sensors.

What is claimed is:

1. A sensor unit comprising:
   a first component including an airflow sensor;
   a second component; and
   a third component, wherein
   the first component includes
      a lower end portion that is selectively connectable to the second component or the third component,
      an upper end portion that is selectively connectable to the third component or the second component,
      a first flow passage plate,
      a second flow passage plate disposed facing the first flow passage plate, and
      at least one support post configured to support the second flow passage plate with respect to the first flow passage plate so as to form a space, in which the airflow sensor is disposed, between the first flow passage plate and the second flow passage plate.

2. The sensor unit according to claim 1, wherein
   the second component includes a first end portion that is selectively connectable to the lower end portion or the upper end portion, and
   the third component includes a second end portion that is selectively connectable to the upper end portion or the lower end portion.

3. The sensor unit according to claim 2, wherein
the first end portion includes a first peripheral portion that selectively fits to the lower end portion or the upper end portion, and
the second end portion includes a second peripheral portion that selectively fits to the upper end portion or the lower end portion.

4. The sensor unit according to claim 2, wherein
the second component includes a third end portion that is on an opposite side of the first end portion,
the third component includes a fourth end portion that is on an opposite side of the second end portion, and
the third end portion or the fourth end portion is attachable to a fixing portion external to the sensor unit.

5. The sensor unit according to claim 4, wherein
the second component includes a first block and a second block that are separable,
the first block includes the first end portion, and
the second block includes the third end portion that is attachable to the fixing portion.

6. The sensor unit according to claim 1, wherein the space is in communication with a flow passage opening that opens to an outer periphery portion of the first component, the airflow sensor being disposed at a height different from a height of the flow passage opening.

7. The sensor unit according to claim 1, wherein
the first component includes
a first substrate on which the airflow sensor is mounted, the first substrate being installed in the second flow passage plate, and
a second substrate connected to the first substrate via a conductor passing through the at least one support post, the second substrate being installed in the first flow passage plate.

8. The sensor unit according to claim 7, wherein the second component includes a third substrate that is conductively connected to the second substrate.

9. The sensor unit according to claim 8, wherein
the second component includes one or both of at least one separate sensor and a controller configured to acquire sensor signals, and
the at least one separate sensor or the controller is mounted on the third substrate.

10. The sensor unit according to claim 1, wherein the second component includes one or both of at least one separate sensor and a controller configured to acquire sensor signals.

11. An airflow measurement apparatus comprising:
an airflow sensor;
a first flow passage plate;
a second flow passage plate disposed facing the first flow passage plate;
at least one support post configured to support the second flow passage plate with respect to the first flow passage plate so as to form a space, in which the airflow sensor is disposed, between the first flow passage plate and the second flow passage plate;
a first substrate on which the airflow sensor is mounted, the first substrate being installed in the second flow passage plate; and
a second substrate connected to the first substrate via a conductor passing through the at least one support post, the second substrate being installed in the first flow passage plate.

12. A sensor unit comprising:
a first component including an airflow sensor;
a second component; and
a third component, wherein
the first component includes
a lower end portion that is selectively connectable to the second component or the third component, and
an upper end portion that is selectively connectable to the third component or the second component,
the second component includes a first end portion that is selectively connectable to the lower end portion or the upper end portion,
the third component includes a second end portion that is selectively connectable to the upper end portion or the lower end portion,
the second component includes a third end portion that is on an opposite side of the first end portion,
the third component includes a fourth end portion that is on an opposite side of the second end portion,
the third end portion or the fourth end portion is attachable to a fixing portion external to the sensor unit, and
the first component has a height that is a predetermined distance from an external fixing portion.

* * * * *